(12) United States Patent
Brenner et al.

(10) Patent No.: US 9,037,656 B2
(45) Date of Patent: May 19, 2015

(54) METHOD AND SYSTEM FOR FACILITATING INTERACTION WITH MULTIPLE CONTENT PROVIDER WEBSITES

(75) Inventors: David Brenner, Round Lake, IL (US); Roger Bye, Evanston, IL (US); Kevin Foy, Chicago, IL (US); Lucia Robles Noriega, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 406 days.

(21) Appl. No.: 12/972,818

(22) Filed: Dec. 20, 2010

(65) Prior Publication Data

US 2012/0158866 A1 Jun. 21, 2012

(51) Int. Cl.
*G06F 15/16* (2006.01)
*G06F 17/30* (2006.01)
(Continued)

(52) U.S. Cl.
CPC ........... *G06F 17/3089* (2013.01); *H04L 67/306* (2013.01); *H04L 67/2833* (2013.01);
(Continued)

(58) Field of Classification Search
USPC ......... 709/203, 204, 205, 206, 223, 226, 231, 709/217, 219, 224; 707/769, E17.108, 741, 707/770, E17.046, E17.082, 722, 723, 737, 707/749, 752, 755, 759; 726/3, 5, 9, 27, 28, 726/29, 30; 713/151, 152, 153, 168, 169; 725/34, 14, 32, 45, 80, 93; 715/234, 715/230, 240, 716, 719, 748, 751, 753, 772
IPC ..... G06F 17/30,17/30321, 17/30017, 17/30011, G06F 17/30174, 17/30873, 17/30876, 17/301, G06F 17/30109, 17/3028, 17/3074, 17/30781, G06F 17/30861, 17/3089, 17/30893, 17/30899, G06F 17/30902; H04L 51/08, 51/10, 51/22, H04L 51/32, 65/403, 65/60, 65/601, 65/605, H04L 65/102, 65/105, 65/1016, 67/10, 67/02, H04L 67/04, 67/06, 67/1068, 67/1097, 67/322, H04L 67/28, 67/2838, 67/2833, 67/2814, H04L 67/2842, 67/303, 67/306
See application file for complete search history.

(56) References Cited

U.S. PATENT DOCUMENTS 5,537,589 A 7/1996 Dalal
6,035,323 A 3/2000 Narayen et al.
(Continued)

FOREIGN PATENT DOCUMENTS

CN 101489187 A 7/2009
WO 0148985 A1 7/2001
(Continued)

OTHER PUBLICATIONS

United States Patent and Trademark Office, "Non-Final Rejection" for U.S. Appl. No. 12/878,778 dated Nov. 7, 2012, 8 pages.
(Continued)

*Primary Examiner* — Saket K Daftuar

(57) ABSTRACT

A method and system for facilitating interaction between an electronic device and a plurality of content provider websites are disclosed. In one embodiment, the method includes receiving at a server a plurality of information portions provided from the websites, where each of the information portions is associated with a respective copy of information that is available at each of the websites. The method also includes aggregating at the server the information portions so that they are combined into an overall grouping, with the respective information portions being maintained respectively as distinct subportions within the grouping. Further, the method includes sending from the server a message for receipt by a part of the electronic device, the primary message including the grouping. The grouping is sent together with an additional copy of the information or with an indication of that information to which the overall grouping relates.

24 Claims, 12 Drawing Sheets

(51) Int. Cl.
*H04L 12/58* (2006.01)
*H04L 29/08* (2006.01)
*H04L 29/06* (2006.01)

(52) U.S. Cl.
CPC ........... *H04L67/303* (2013.01); *H04L 67/2842* (2013.01); *H04L 67/2814* (2013.01); *G06F 17/3074* (2013.01); *G06F 17/30893* (2013.01); *G06F 17/3028* (2013.01); *G06F 17/30876* (2013.01); *G06F 17/30899* (2013.01); *G06F 17/30873* (2013.01); *H04L 65/605* (2013.01); *H04L 65/601* (2013.01); *H04L 65/1016* (2013.01); *H04L 65/105* (2013.01); *H04L 65/102* (2013.01); H04L 51/32 (2013.01); H04L 67/02 (2013.01); H04L 67/2838 (2013.01)

(56) References Cited

U.S. PATENT DOCUMENTS

| | | |
|---|---|---|
| 6,229,534 B1 | 5/2001 | Gerra et al. |
| 6,304,894 B1 | 10/2001 | Nakayama et al. |
| 6,513,026 B1* | 1/2003 | Horvitz et al. ............... 706/46 |
| 6,601,012 B1* | 7/2003 | Horvitz et al. ............. 702/150 |
| 6,687,732 B1 | 2/2004 | Bector et al. |
| 6,801,603 B1* | 10/2004 | Arev et al. ................ 379/88.17 |
| 7,249,159 B1* | 7/2007 | Horvitz et al. ............. 709/206 |
| 7,359,737 B2* | 4/2008 | Ishii ........................... 455/567 |
| 7,379,760 B2* | 5/2008 | Ishii ........................... 455/567 |
| 7,417,650 B1* | 8/2008 | Horvitz ...................... 715/765 |
| 7,461,094 B2 | 12/2008 | Morris et al. |
| 7,502,795 B1 | 3/2009 | Svendsen et al. |
| 7,523,138 B2 | 4/2009 | Gruhl et al. |
| 7,529,797 B2 | 5/2009 | Tseng et al. |
| 7,574,653 B2 | 8/2009 | Croney et al. |
| 7,617,220 B2 | 11/2009 | Crowley et al. |
| 7,673,327 B1* | 3/2010 | Polis et al. ....................... 726/5 |
| 7,693,953 B2 | 4/2010 | Middleton et al. |
| 7,769,764 B2* | 8/2010 | Ramer et al. ............... 707/751 |
| 7,779,073 B2 | 8/2010 | Hoile et al. |
| 7,797,732 B2 | 9/2010 | Tam et al. |
| 7,814,537 B2 | 10/2010 | Fredell |
| 7,853,558 B2 | 12/2010 | Brindley |
| 7,886,000 B1* | 2/2011 | Polis et al. ................... 709/203 |
| 7,899,455 B2* | 3/2011 | Ramer et al. ............... 455/432.3 |
| 7,908,647 B1* | 3/2011 | Polis et al. ....................... 726/5 |
| 8,027,874 B2* | 9/2011 | Angles et al. ............... 705/14.4 |
| 8,041,717 B2* | 10/2011 | Ramer et al. ............... 707/733 |
| 8,131,767 B2 | 3/2012 | Brindley |
| 8,204,952 B2 | 6/2012 | Stremel et al. |
| 8,208,947 B2 | 6/2012 | Yasrebi et al. |
| 8,224,298 B2 | 7/2012 | Smith et al. |
| 8,234,193 B2 | 7/2012 | Ransom et al. |
| 8,250,153 B2* | 8/2012 | Kamat ......................... 709/206 |
| 8,266,154 B2 | 9/2012 | Guo et al. |
| 8,275,796 B2* | 9/2012 | Spivack et al. .............. 707/794 |
| 8,295,819 B1 | 10/2012 | Kaplan et al. |
| 8,489,132 B2 | 7/2013 | Karmarkar et al. |
| 8,504,711 B1 | 8/2013 | Lunt |
| 8,543,731 B2 | 9/2013 | Lu et al. |
| 8,589,495 B1 | 11/2013 | Beckert |
| 8,621,037 B2 | 12/2013 | Li et al. |
| 8,782,022 B2 | 7/2014 | Jana et al. |
| 2001/0034771 A1 | 10/2001 | Hutsch et al. |
| 2002/0058522 A1 | 5/2002 | Kim et al. |
| 2002/0078180 A1 | 6/2002 | Miyazawa |
| 2002/0090932 A1 | 7/2002 | Bhatia et al. |
| 2002/0095312 A1 | 7/2002 | Wheat |
| 2002/0112001 A1 | 8/2002 | Sutherland et al. |
| 2002/0154759 A1* | 10/2002 | Ishii ....................... 379/373.01 |
| 2003/0004880 A1 | 1/2003 | Banerjee et al. |
| 2003/0163536 A1 | 8/2003 | Pettine, Jr. |
| 2003/0167264 A1 | 9/2003 | Agura et al. |
| 2004/0103158 A1 | 5/2004 | Vella et al. |
| 2004/0210637 A1 | 10/2004 | Loveland |
| 2004/0229635 A1 | 11/2004 | Hertz |
| 2004/0244102 A1 | 12/2004 | Benzon et al. |
| 2004/0255335 A1 | 12/2004 | Fickle et al. |
| 2005/0182767 A1 | 8/2005 | Shoemaker et al. |
| 2005/0198305 A1 | 9/2005 | Pezaris et al. |
| 2005/0209927 A1 | 9/2005 | Aaltonen et al. |
| 2005/0216550 A1 | 9/2005 | Paseman et al. |
| 2005/0264845 A1 | 12/2005 | Edwards et al. |
| 2006/0007902 A1 | 1/2006 | Heller |
| 2006/0010225 A1 | 1/2006 | Issa |
| 2006/0036674 A1 | 2/2006 | Walden et al. |
| 2006/0128404 A1 | 6/2006 | Klassen et al. |
| 2006/0155698 A1 | 7/2006 | Vayssiere |
| 2006/0183097 A1* | 8/2006 | Ishii .......................... 434/307 R |
| 2006/0212846 A1 | 9/2006 | O'Farrell et al. |
| 2006/0224739 A1 | 10/2006 | Anantha |
| 2006/0271384 A1 | 11/2006 | Munson et al. |
| 2007/0027857 A1 | 2/2007 | Deng et al. |
| 2007/0033255 A1 | 2/2007 | Sanjeeva et al. |
| 2007/0073837 A1 | 3/2007 | Johnson-McCormick et al. |
| 2007/0094276 A1* | 4/2007 | Isaac ............................ 707/100 |
| 2007/0094390 A1 | 4/2007 | Nussey |
| 2007/0118425 A1* | 5/2007 | Yruski et al. ..................... 705/14 |
| 2007/0121821 A1 | 5/2007 | Su |
| 2007/0157110 A1 | 7/2007 | Gandhi et al. |
| 2007/0219910 A1 | 9/2007 | Martinez |
| 2007/0230374 A1 | 10/2007 | Altberg et al. |
| 2007/0239874 A1* | 10/2007 | Lazaridis et al. ............. 709/226 |
| 2007/0240072 A1* | 10/2007 | Cunningham et al. ........ 715/764 |
| 2007/0282959 A1* | 12/2007 | Stern ............................ 709/206 |
| 2007/0288636 A1* | 12/2007 | Rogers et al. ................ 709/226 |
| 2007/0288836 A1 | 12/2007 | Partovi |
| 2008/0016245 A1* | 1/2008 | Cunningham et al. ........ 709/246 |
| 2008/0034064 A1 | 2/2008 | Choi et al. |
| 2008/0086319 A1* | 4/2008 | Berger .............................. 705/1 |
| 2008/0133525 A1 | 6/2008 | Ott |
| 2008/0148366 A1 | 6/2008 | Wahl |
| 2008/0155112 A1* | 6/2008 | Ma et al. ....................... 709/231 |
| 2008/0162260 A1 | 7/2008 | Rohan et al. |
| 2008/0168381 A1 | 7/2008 | Nelson et al. |
| 2008/0172458 A1 | 7/2008 | Middleton et al. |
| 2008/0189395 A1 | 8/2008 | Stremel et al. |
| 2008/0242370 A1 | 10/2008 | Lando et al. |
| 2008/0256170 A1 | 10/2008 | Hayashi et al. |
| 2008/0256198 A1* | 10/2008 | Kamat .......................... 709/206 |
| 2008/0258913 A1 | 10/2008 | Busey |
| 2008/0267218 A1* | 10/2008 | Linnamaki et al. ............ 370/477 |
| 2008/0301233 A1 | 12/2008 | Choi |
| 2008/0306974 A1 | 12/2008 | Van Steenbergen et al. |
| 2008/0320040 A1 | 12/2008 | Zhurakhinskaya |
| 2009/0006642 A1 | 1/2009 | Dickens et al. |
| 2009/0007244 A1 | 1/2009 | Monahan et al. |
| 2009/0037566 A1 | 2/2009 | Hoile et al. |
| 2009/0044142 A1 | 2/2009 | Faris et al. |
| 2009/0070412 A1 | 3/2009 | D'Angelo et al. |
| 2009/0111490 A1 | 4/2009 | Bell et al. |
| 2009/0113975 A1 | 5/2009 | Eddens |
| 2009/0119375 A1 | 5/2009 | Shenfield |
| 2009/0125544 A1 | 5/2009 | Brindley |
| 2009/0138477 A1 | 5/2009 | Piira et al. |
| 2009/0143052 A1 | 6/2009 | Bates et al. |
| 2009/0144392 A1 | 6/2009 | Wang et al. |
| 2009/0164554 A1 | 6/2009 | Wei |
| 2009/0187820 A1 | 7/2009 | Stinson et al. |
| 2009/0204666 A1* | 8/2009 | Sana et al. ..................... 709/203 |
| 2009/0210514 A1 | 8/2009 | Davis et al. |
| 2009/0217475 A1 | 9/2009 | Broman et al. |
| 2009/0238538 A1 | 9/2009 | Fink |
| 2009/0240807 A1* | 9/2009 | Munson et al. ............... 709/226 |
| 2009/0259971 A1* | 10/2009 | Rankine et al. ............... 715/810 |
| 2009/0287701 A1 | 11/2009 | Breaker et al. |
| 2009/0298480 A1 | 12/2009 | Khambete et al. |
| 2009/0299963 A1 | 12/2009 | Pippuri |
| 2009/0300139 A1* | 12/2009 | Shoemaker et al. .......... 709/217 |
| 2009/0307715 A1 | 12/2009 | Santamaria et al. |
| 2009/0319559 A1 | 12/2009 | Westerfeld |
| 2009/0320077 A1 | 12/2009 | Gazdzinski |
| 2010/0005520 A1 | 1/2010 | Abbot et al. |

(56) References Cited

U.S. PATENT DOCUMENTS

| | | | |
|---|---|---|---|
| 2010/0011425 A1* | 1/2010 | Eyal | 726/5 |
| 2010/0011431 A1 | 1/2010 | Cynkin et al. | |
| 2010/0049810 A1 | 2/2010 | Maeda | |
| 2010/0080410 A1 | 4/2010 | Deluca et al. | |
| 2010/0082576 A1 | 4/2010 | Walker et al. | |
| 2010/0100952 A1* | 4/2010 | Sample et al. | 726/9 |
| 2010/0114946 A1 | 5/2010 | Kumar et al. | |
| 2010/0145924 A1 | 6/2010 | Zabramski et al. | |
| 2010/0179915 A1 | 7/2010 | Nastacio | |
| 2010/0192207 A1* | 7/2010 | Raleigh | 726/6 |
| 2010/0205211 A1 | 8/2010 | Ghosh | |
| 2010/0205221 A1 | 8/2010 | Shaw et al. | |
| 2010/0205279 A1* | 8/2010 | Takakura | 709/219 |
| 2010/0211651 A1 | 8/2010 | Guedalia et al. | |
| 2010/0217834 A1 | 8/2010 | Woodcock et al. | |
| 2010/0223066 A1* | 9/2010 | Berger | 705/1.1 |
| 2010/0235329 A1* | 9/2010 | Koren et al. | 707/687 |
| 2010/0235476 A1* | 9/2010 | Lin et al. | 709/219 |
| 2010/0241755 A1 | 9/2010 | Bassett et al. | |
| 2010/0250648 A1 | 9/2010 | Cao et al. | |
| 2010/0266167 A1 | 10/2010 | Kodesh et al. | |
| 2010/0287053 A1 | 11/2010 | Ganong et al. | |
| 2010/0293105 A1 | 11/2010 | Blinn et al. | |
| 2010/0299453 A1 | 11/2010 | Fox et al. | |
| 2010/0299455 A1 | 11/2010 | Master et al. | |
| 2010/0306249 A1* | 12/2010 | Hill et al. | 707/769 |
| 2010/0318925 A1 | 12/2010 | Sethi et al. | |
| 2010/0325194 A1 | 12/2010 | Williamson et al. | |
| 2010/0332958 A1* | 12/2010 | Weinberger et al. | 715/201 |
| 2011/0016176 A1* | 1/2011 | Roberts | 709/203 |
| 2011/0016197 A1 | 1/2011 | Shiimori et al. | |
| 2011/0022476 A1 | 1/2011 | Barkley et al. | |
| 2011/0047229 A1 | 2/2011 | Sinha et al. | |
| 2011/0055209 A1 | 3/2011 | Novac et al. | |
| 2011/0060793 A1 | 3/2011 | Wheeler et al. | |
| 2011/0061091 A1 | 3/2011 | Wheeler et al. | |
| 2011/0087652 A1 | 4/2011 | Westin et al. | |
| 2011/0113086 A1 | 5/2011 | Long et al. | |
| 2011/0150362 A1 | 6/2011 | Mitra et al. | |
| 2011/0179378 A1 | 7/2011 | Wheeler et al. | |
| 2011/0184780 A1 | 7/2011 | Alderson et al. | |
| 2011/0191406 A1 | 8/2011 | Plunkett et al. | |
| 2011/0197123 A1 | 8/2011 | Caine et al. | |
| 2011/0231478 A1 | 9/2011 | Wheeler et al. | |
| 2011/0238755 A1 | 9/2011 | Khan et al. | |
| 2011/0282867 A1 | 11/2011 | Palermiti, II et al. | |
| 2012/0042236 A1 | 2/2012 | Adler, III et al. | |
| 2012/0066286 A1 | 3/2012 | Heredia et al. | |
| 2012/0072494 A1 | 3/2012 | Wong et al. | |
| 2012/0110429 A1 | 5/2012 | Tzonis et al. | |
| 2012/0117167 A1 | 5/2012 | Sadja et al. | |
| 2012/0130834 A1 | 5/2012 | Landry | |
| 2012/0144317 A1 | 6/2012 | Balasubramanian et al. | |
| 2012/0203651 A1 | 8/2012 | Leggatt | |
| 2012/0290601 A1 | 11/2012 | Huang | |
| 2012/0311029 A1 | 12/2012 | Schuster et al. | |
| 2012/0331141 A1 | 12/2012 | Carter et al. | |
| 2013/0036155 A1 | 2/2013 | Shaw et al. | |
| 2013/0091204 A1 | 4/2013 | Loh et al. | |
| 2013/0097279 A1 | 4/2013 | Polis et al. | |

FOREIGN PATENT DOCUMENTS

| | | |
|---|---|---|
| WO | 0169387 A2 | 9/2001 |
| WO | 2007022513 A2 | 2/2007 |
| WO | 2008020312 A2 | 2/2008 |
| WO | 2008094154 A1 | 8/2008 |
| WO | 2008/112805 A1 | 9/2008 |
| WO | 2008131452 A1 | 10/2008 |
| WO | 2009/039509 A2 | 3/2009 |
| WO | 2009036470 A9 | 3/2009 |
| WO | 2011031962 A1 | 3/2011 |
| WO | 2011063859 A1 | 6/2011 |

OTHER PUBLICATIONS

United States Patent and Trademark Office, "Non-Final Rejection" for U.S. Appl. No. 12/878,778, dated Nov. 7, 2012, 23 pages.

United States Patent and Trademark Office, "Non-Final Rejection" for U.S. Appl. No. 12/878,707; May 7, 2012; 7 pages.

International Application No. PCT/US2011/063859; "Notification of Transmittal of International Search Report and Written Opinion of International Searching Authority"; Mar. 6, 2012; 12 pages.

Differitas Network Norway; Content Provider API—SMS; Implementation Guide Version 1.6; © 2006-2007; 59 pages.

Ogasawara, Todd; "The Reason for the 160 Character Text Message and 140 Character Twitter Length Limits"; SocialTimes.com; May 4, 2009; 4 pages.

Brown, Jeff et al.; University of North Carolina Wilmington; "SMS: The Short Message Service"; Dec. 2007; pp. 106-110.

Patent Cooperation Treaty, "PCT Search Report and Written Opinion of the International Searching Authority" for International Application No. PCT/US2011/064031 dated Jun. 12, 2012, 12 pages.

Multiply—secure, family-friendly media sharing; www.multiply.com; Feb. 2009; 1 page.

U.S. Appl. No. 12/972,787 entitled "Method and System for Facilitating Interaction with Multiple Content Provider Websites"; filed Dec. 20, 2010.

Yahoo Go for Mobile; Yahoo Go for Mobile Online Software & Service reviews—CNET Reviews; http://reviews.cnet.com/online-software-services/yahoo-go-for-mobile/4505-9239_7-31849319.html; 2006; 3 pages.

Yahoo Go for TV beta; Yahoo Go for TV beta Online Software & Service reviews—CNET Reviews; http://reviews.cnet.com/online-software-services/yahoo-go-for-tv/4505-9239_7-31855439.html; 2006; 3 pages.

Yahoo! Go 3.0 Announced at CES—ReadWriteWeb; Yahoo! Go 3.0 Announced at CES—is Yahoo! Back in '08?; http://www.readwriteweb.com/archives/yahoo_life_and_go_3_ces.php; 2008; 2 pages.

Yahoo! Go for Mobile 2.0 (gamma); Killer Apps for Mobile Phones; Aug. 2007; http://www.pcmag.com/print_article 2/0,1217,a%253D209042,00.asp; 19 pages.

Yahoo!® for Mobile;Your favorite Yahoo! services, on our phone; http://mobile.yahoo.com; available on or before Jun. 9, 2010; 1 page.

SMS Tools—Free software downloads and software reviews—CNET Download.com; http://download.cnet.com/windows/sms-tools/ available on or before Jun. 9, 2010; 5 pages.

Yahoo! Go—Wikipedia, the free encyclopedia; Yahoo! Go; http://en.wikipedia.org/wiki/Yahoo!_Go; available on or before Jun. 9, 2010; 1 page.

Patent Cooperation Treaty, "PCT Search Report and Written Opinion of the International Searching Authority" for International Application No. PCT/US2010/048429 Jan. 20, 2011, 13 pages.

Ferrara S: "Blackberry Communication 1-3 Flow" Internet Article, [Online] Sep. 7, 2004, XP002611054. My IT forum. com Retrieved from the Internet: URL:http://www.myitforum,com/articles/1/view.asp?id=7752> [retrieved on Nov. 22, 2010].

Research in Motion Limited: "Feature and Technical Overview—BlackBerry Enterprise Server for IBM Lotus Domino V4.1.6" [Online] Jul. 14, 2008, pp. 7PP-5-77, XP002611055. Retrieved from the Internet: URL:http://docs.blackberry.com/en/admin/deliverables/2740/FTO_D_456681_11.pdf> {retrieved on Nov. 19, 2010].

Anonymous: "Push e-mail" [Online] Sep. 3, 2009, XP002611056. Wikipedia, the free encyclopedia Retrieved from the Internet: URL:http://en.wikipedia.org/w/index.php?title=Push_e-mail&oldid=311724632> [retrieved on Nov. 18, 2010].

Mitchell S: "Updates to the TextBox Word / Character Counter Control" [Online] Jan. 7, 2009, XP002611057. 4 Guys from Rolla.com Retrieved from the Internet: URL:http://www.4guysfromrolla.com/articles/010709-1.aspx> [retrieved on Nov. 19, 2010].

(56) References Cited

OTHER PUBLICATIONS

Research in Motion Limited: "BlackBerry Mobile Data System—Technical Overview" [Online] Oct. 10, 2006, XP002611058 BlackBerry. Retrieved from the Internet: URL:http://www.blackberry.com/knowledgecenterpublic/livelink.exe/fetch/2000/7979/1181821/832210/BlackBerry_Mobile_Data_System_4.1_Technical_Overview?nodeid=1199663&vernum=O> [retrieved on Nov. 19, 2010].

Anonymous: "Proxy server" [Online] Sep. 8, 2009, XP002611059 Wikipedia, the free encyclopedia. Retrieved from the Internet: URL:http://en.wikipedia.org/w/index.php?title=Proxy_server&oldid=312641025&printable=yes> [retrieved on Nov. 22, 2010].

Duke L: "BlackBerry for Home Users Understanding BlackBerry Internet Service (BIS)" [Online] Jul. 19, 2008, XP002611060. Suite101.com Retrieved from the Internet: URL:http://www.suite101.com/content/blackberry-for-home-users-a60963> [retrieved on Nov. 22, 2010].

Anonymous: "Adium" [Online] Sep. 7, 2009, XP002611061 Wikipedia, the free encyclopedia Retrieved from the Internet: URL:http://en.wikipedia.org/w/index.php?title=Adium&oldid=312395669>[retrieved on Nov. 24, 2010].

Patent Cooperation Treaty, "PCT Search Report and Written Opinion of the International Searching Authority" for International Application No. PCT/US2010/048420 Nov. 10, 2010, 11 pages.

Patent Cooperation Treaty, "PCT Search Report and Written Opinion of the International Searching Authority" for International Application No. PCT/US2010/047073 Dec. 6, 2010, 10 pages.

Patent Cooperation Treaty, "PCT Search Report and Written Opinion of the International Searching Authority" for International Application No. PCT/US2010/045442 Dec. 6, 2010, 12 pages.

United States Patent & Trademark Office, Non-Final Office Action for U.S. Appl. No. 12/878,705 dated Dec. 21, 2012, 17 pages.

United States Patent & Trademark Office, Non-Final Office Action for U.S. Appl. No. 12/878,839 dated Jan. 7, 2013, 20 pages.

United States Patent & Trademark Office, Non-Final Office Action for U.S. Appl. No. 12/878,702 dated Feb. 5, 2013, 17 pages.

United States Patent & Trademark Office, Non-Final Office Action for U.S. Appl. No. 12/878,839 dated May 30, 2013, 25 pages.

United States Patent & Trademark Office, Final Rejection for U.S. Appl. No. 12/878,705 dated Sep. 13, 2013, 19 pages.

United States Patent and Trademark Office, "Non-Final Rejection" for U.S. Appl. No. 12/972,787 dated Oct. 2, 2013, 19 pages.

United States Patent & Trademark Office, Notice of Allowance and Fee(s) Due for U.S. Appl. No. 12/878,702 dated Nov. 8, 2013, 15 pages.

United States Patent & Trademark Office, "Notice of Allowance and Fee(s) Due" for U.S. Appl. No. 12/878,702 dated Mar. 18, 2014, 6 pages.

United States Patent & Trademark Office, "Notice of Allowance and Fee(s) Due" for U.S. Appl. No. 12/878,839 dated Feb. 3, 2014, 21 pages.

International Preliminary Report on Patentability for PCT Patent Application No. PCT/US2011/064031, mailed on Jun. 25, 2013, 7 pages.

"Micro-blog Update N in One", Computer Fan, fortnightly periodical, No. 11, Jun. 15, 2010, p. 38.

Office Action for CN Application No. 201180061571.0, mailed Feb. 27, 2015, 26 pages.

Wang, "It Should be Also Simple to Detect Micro-blog Update", Computer Fan, fortnightly periodical, No. 13, Jul. 15, 2010, p. 34.

\* cited by examiner

METHOD AND SYSTEM FOR FACILITATING INTERACTION WITH MULTIPLE CONTENT PROVIDER WEBSITES

CROSS-REFERENCE TO RELATED APPLICATIONS

The present application claims the benefit of, and hereby incorporates by reference, the other patent application having the same title as the present application and filed on even date herewith.

FIELD OF THE INVENTION

The present invention relates to communications involving electronic devices and, more particularly, to communications between such devices and content provider websites.

BACKGROUND OF THE INVENTION

Content provider websites (CPWs) are interactive websites that allow for the downloading and/or uploading (e.g., posting) of various forms of information, data (which can generally be considered "content"). CPWs encompass a variety of types of websites including, for example, social networking websites (SNWs), news feeds, music and photograph websites, as well as other types of websites such as business-to-business (b2b) or business-to-consumer (b2c) websites. The forms of content that can be downloaded from and/or uploaded to CPWs are wide ranging and can include, for example, news, weather, personal and/or business information, pictures, videos, songs, etc.

The communication of content by way of CPWs can serve a variety of purposes. Among other things, the uploading of content to a CPW by one user can allow other users to access and/or download the uploaded content. Indeed, many CPWs (typically this is true of SNWs in particular) provide an architecture for countless users to create respective personal or professional spaces that respectively identify the respective users and allow uploaded content to be associated with the respective spaces that can in turn be accessed by other users. By virtue of such operation, CPWs can facilitate the creation and maintaining of interpersonal connections among persons and groups.

CPWs can be in communication with users who are operating any of a variety of different types of electronic devices, which are in contact with the CPWs often by way of internet-type networks. Increasingly, users employ mobile devices to interact with the CPWs. As communications activities with CPWs increase, and particularly in some circumstances where a given mobile device is in communication with multiple CPWs, the communications can become tedious and difficult to manage. For example, when a user wishes for content from the user's mobile device to be uploaded to multiple CPWs, the user may need to command the mobile device to perform, and the mobile device may need to perform, in a redundant manner, the same or similar uploading tasks in relation to each of the different CPWs.

Also for example, when a user wishes to modify content already uploaded to multiple CPWs, the tasks involved in effecting the desired modification at the different CPWs can be difficult to execute given the different characteristics or requirements of the different CPWs. Among other things, performing actions on the uploaded content can be complicated by the fact that one CPW may or may not support the same action as another CPW, such that a user attempting to cause such actions will need to remember which CPW supports the action in question.

Further for example, when the user's mobile device (and thus the user) is in communication with multiple CPWs, it can become difficult for the user to keep track of different communications occurring in relation to the various CPWs, e.g., as may occur when other users contribute messages to the various CPWs. It can be particularly confusing for a user to keep track of different communications when the communications involving the various CPWs all relate to the same topic.

It would therefore be advantageous if improved systems and/or improved methods for facilitating interactions between mobile or other electronic devices and CPWs could be developed that would help to address, at least partly, one or more of the aforementioned developing needs.

SUMMARY OF THE INVENTION

In at least one embodiment, the present invention relates to a method of facilitating interaction between an electronic device and a plurality of content provider websites. The method includes receiving at a server a plurality of information portions, respectively, provided from the plurality of content provider websites, respectively, where each of the plurality of information portions is associated with a respective copy of primary information that is available at each of the content provider websites. The method additionally includes aggregating at the server the respective information portions so that the plurality of information portions are combined into an overall grouping, where the respective information portions are maintained respectively as distinct subportions within the overall grouping. Further, the method also includes sending from the server a primary message for receipt by at least one part of the electronic device, the primary message including the overall grouping of the information portions, where the overall grouping is sent together with an additional copy of the primary information or with an indication of the primary information to which the overall grouping relates, whereby the electronic device, upon the primary message being received by the at least one part thereof, is able to display an image showing both at least a portion of the primary information in conjunction with the overall grouping including the distinct subportions.

In at least one further embodiment, the present invention relates to a system for facilitating interaction between an electronic device and a plurality of content provider websites. The system includes a first server having a processing device and at least one memory device, where the server operates as an intermediary between at least one part of the electronic device and the plurality of content provider websites. The first server particularly is configured to operate so that, upon receiving a plurality of information portions respectively provided from the plurality of content provider websites respectively, and upon determining that the plurality of information portions all relate to primary information that is available at each of the content provider websites, the first server aggregates the information portions so as to be combined into an overall grouping in which the respective information portions are maintained respectively as distinct subportions.

DETAILED DESCRIPTION

Figure 1:
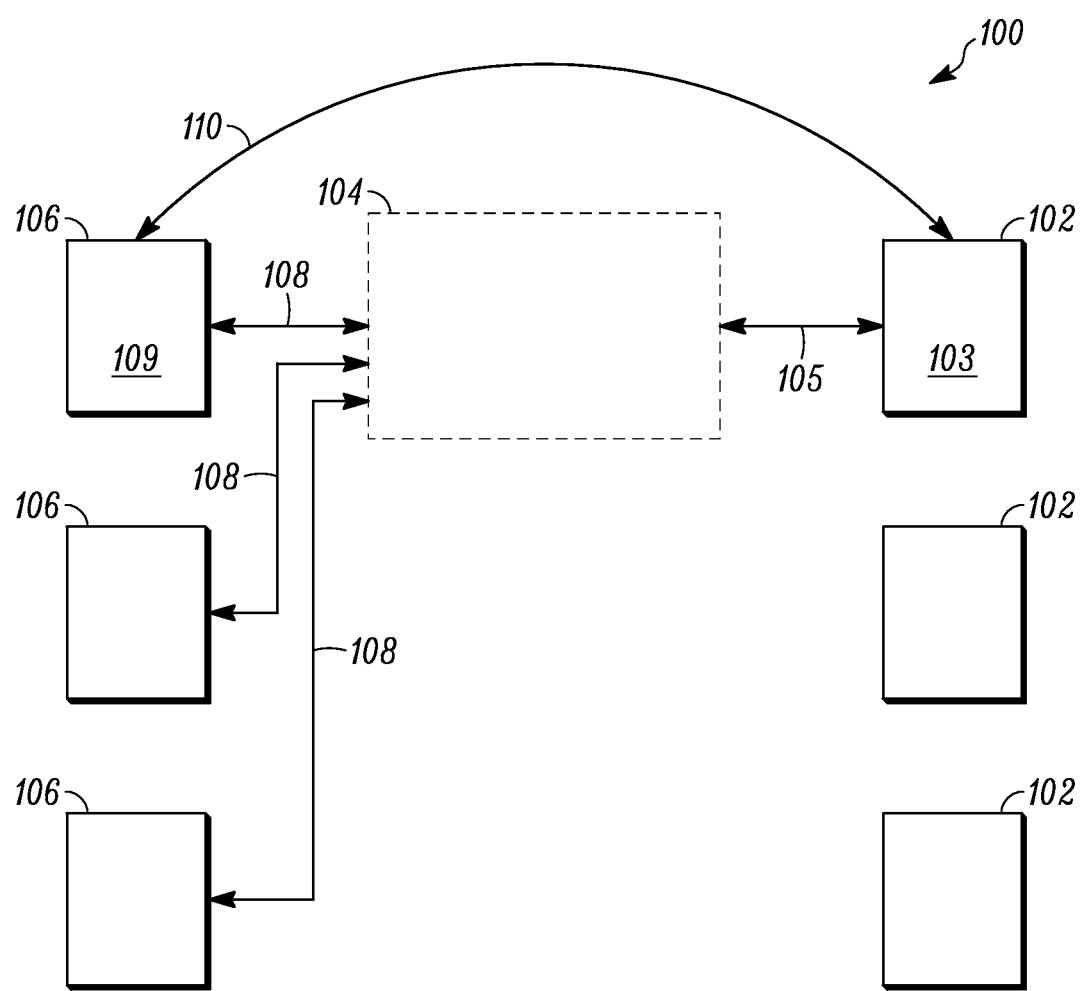
FIG. 1 shows in schematic form an example communications system involving a plurality of electronic devices in communication with a plurality of content provider websites, where some of the communications occur via an intermediary server.

Referring to FIG. 1, a block diagram of an example communications system 100 is shown in a simplified schematic form. As shown, the communications system 100 includes in this embodiment three mobile devices 102, a first one 103 of which is shown to be in communication via a communication link 105 with a server, which in the present embodiment is a web server 104 (e.g., a server that supports internet protocols or otherwise is capable of interaction with the internet or World Wide Web). The mobile devices 102 are respectively representative of communication devices operated by persons (or users) or possibly by other entities (e.g., other computers) desiring or requiring communication capabilities. In some embodiments, for example, the mobile devices 102 can be any of cellular telephones, personal digital assistants (PDAs), smart phones, other handheld or portable electronic devices, headsets, MP3 players, battery-powered devices, wearable devices, radios, navigation devices, laptop or notebook computers, netbooks, pagers, PMPs (personal media players), DVRs (digital video recorders), gaming devices, cameras, netbooks, e-readers, e-books, tablet devices, navigation devices with video capable screens, multimedia docking stations, or other mobile devices.

The communications system 100 additionally is shown to include three content provider websites (CPWs) 106, each of which is shown to be in communication with the intermediary web server 104 via a respective communication link 108. Further, a communication link 110 is also provided that allows for the first one 103 of the mobile devices 102 that is shown to be in communication with the web server 104 to directly communicate with a first one 109 of the CPWs 106 that is also in communication with the web server, without the intermediation of the web server 104. Although only the first one 103 of the mobile devices 102 is shown to be in communication with the web server 104, it will be understood that depending upon the time or operational circumstance, any or all of the mobile devices 102 can be in communication with the web server. Further, depending upon the time or operational circumstance, any of the mobile devices 102 can also or alternatively enter into communication with any of the CPWs 106 by way of direct communication links such as the link 110.

The CPWs 106 are generally intended to encompass a variety of interactive websites including, for example, social networking websites (SNWs) that allow for the downloading, uploading (e.g., posting), and/or other accessing of various forms of data, such as personal and/or business information, news information, weather information, pictures, videos, and songs and thereby facilitate the creation and maintaining of interpersonal connections among persons and groups of persons. Examples of such CPWs include, for example, Facebook™, MySpace™, hi5™, LinkedIn™, and Twitter™. For purposes of the present invention, CPWs can also be understood to encompass various other types of websites (e.g., business-to-business websites, business-to-consumer websites and/or other websites that, while not focused entirely or predominantly upon social networking, nevertheless also include social networking-type features). For example, other CPWs can include sources of RSS (Really Simple Syndication) or other news feeds, photograph services such as Picasa™ or Photobucket™, and music services such as LastFM™. Generally speaking, the CPWs 106 can encompass any websites to which data can be uploaded and/or from which data can be downloaded to mobile devices such as the mobile devices 102.

Although three mobile devices 102 are shown in FIG. 1, in other embodiments only one mobile device is present in communication with the web server 104, or alternatively any arbitrary number of mobile devices can be in communication with the web server 104. Likewise, although three CPWs 106 are shown to be in communication with the web server 104 in FIG. 1, in other embodiments only one CPW is in communication with the web server 104, or alternatively any arbitrary number of CPWs can be in communication with the web server 104. Additionally, any arbitrary number of mobile device(s) can be in communication with any arbitrary number of CPW(s) by way of direct communication links such as the link 110 in other embodiments. That is, FIG. 1 is intended to be representative of any of a variety of systems employing any arbitrary number of mobile devices and any arbitrary number of CPWs that are in communication with one another either indirectly via a web server interface or directly with one another. That said, as discussed further below, at least some embodiments of the present invention particularly are directed toward facilitating communications/interactions between a given mobile device (e.g., the first one 103 of the mobile device 102) and multiple (e.g., at least two) CPWs.

Depending upon the embodiment, the communication links 105, 108, 110 can be part of a single network or multiple networks, and each link can include one or more wired and/or wireless communication pathways, for example, landline (e.g., fiber optic, copper) wiring, microwave communication, radio channel, wireless path, intranet, internet, and/or World Wide Web communication pathways (which themselves can employ numerous intermediary hardware and/or software devices including, for example, numerous routers, etc.). In addition, a variety of communication protocols and methodologies can be used to conduct the communications via the communication links 105, 108, 110 between the mobile devices 102, web server 104, and CPWs 106, including for example, transmission control protocol/internet protocol (TCP/IP), extensible messaging and presence protocol (XMPP), file transfer protocol (FTP), etc. In other embodiments, other types of communication links for facilitating the transfer of signals between the plurality of mobile devices 102 and the CPWs 106 can be utilized as well. Although in the present embodiment the communication links/network and server are each discussed as being web-based, in other embodiments, the links/network and server can assume various non-web-based forms.

As will be discussed in more detail below, the web server 104 is configured to serve as an intermediary between the mobile devices 102 and the CPWs 106. Various types of communications between the mobile devices 102 and CPWs 106 are passed through, processed and/or monitored by the web server 104 including, for example, communications involving the uploading and downloading of files (e.g., photos, music, videos, text entries, etc.), blog postings, and messaging (e.g., Short Message Service (SMS), Multimedia Messaging Service (MMS), and Instant Messaging (IM)). More particularly, in some embodiments, the web server 104 operates in one or more manners that facilitate communications/interactions between the mobile devices 102 and CPWs 106 involving: the uploading of information to multiple ones of the CPWs 106 from a given one (e.g., the first one 103) of the mobile devices 102; the downloading of information from multiple ones of the CPWs 106 to a given (e.g., the first one 103) of the mobile devices; the editing of information at multiple ones of the CPWs; and/or the deletion of information from multiple ones of the CPWs. Further, in some embodiments, the web server 104 also or instead operates in one or more manners that facilitate aggregation and/or organization of information found at multiple ones of the CPWs 106 and/or facilitates the presentation or other usage of such information at a given one (e.g., the first one 103) of the mobile devices 102.

Figure 2:
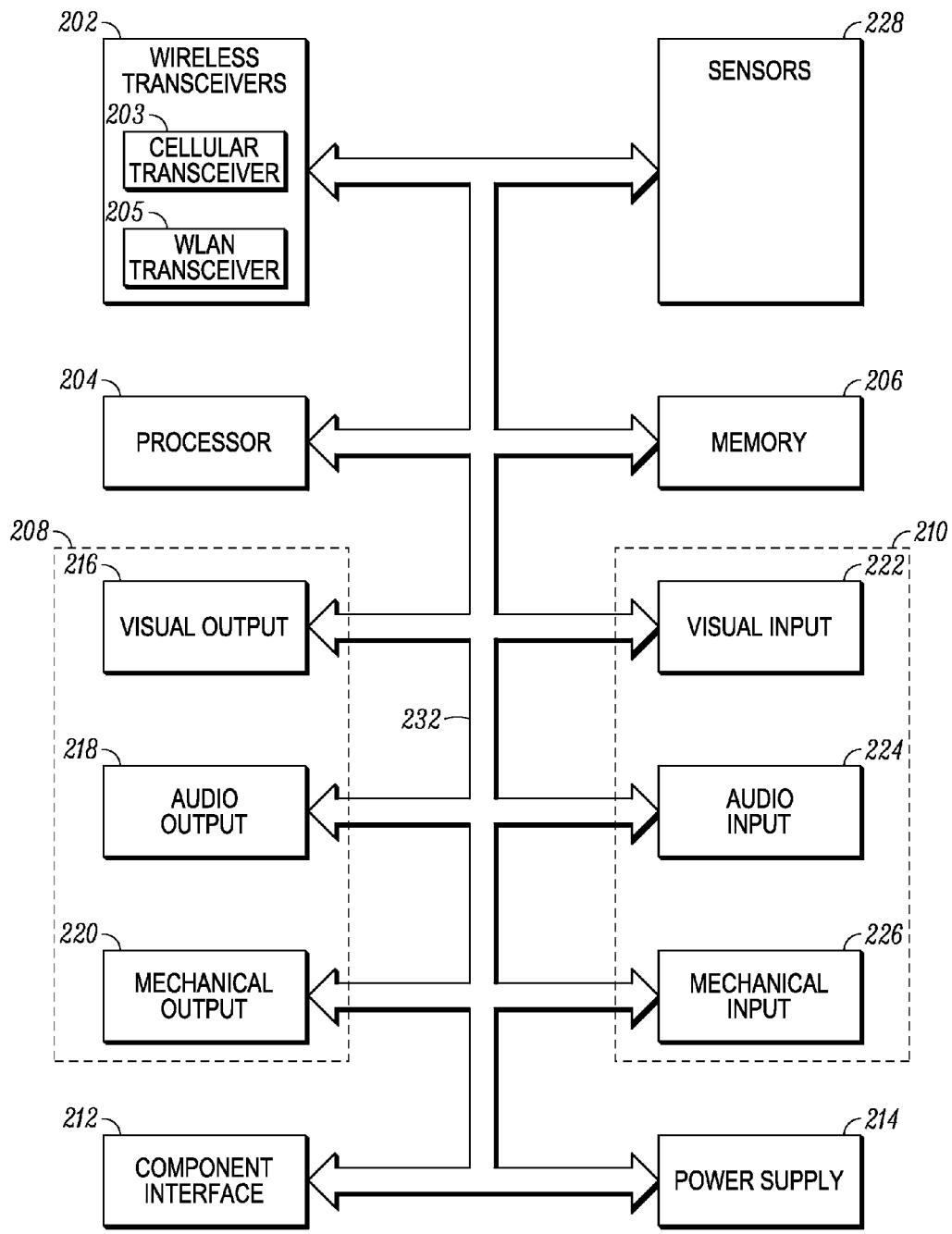
FIG. 2 is a block diagram showing example components of one of the electronic devices of FIG. 1.

Referring to FIG. 2, there is provided a block diagram illustrating example internal components 200 of the first one 103 of the mobile devices 102 of FIG. 1, in accordance with the present embodiment. It should be understood that it is possibly the case, albeit not necessarily the case, that these internal components are also present in one or more of the other ones of the mobile devices 102 of FIG. 1, and not just the first one 103. As shown in FIG. 2, the components 200 include one or more wireless transceivers 202, a processor 204 (e.g., a microprocessor, microcomputer, application-specific integrated circuit, etc.), a memory portion 206, one or more output devices 208, and one or more input devices 210. In at least some embodiments, a user interface is present that comprises one or more of the output devices 208, such as a display, and one or more of the input device 210, such as a keypad or touch sensor.

The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Each of the wireless transceivers 202 utilizes a wireless technology for communication, which can include for example (but are not limited to) cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), Bluetooth and IEEE 802.11(a, b, g or n), or other wireless communication technologies such as infrared technology. In the present embodiment, the wireless transceivers 202 include a cellular transceiver 203 and a wireless local area network (WLAN) transceiver 205, although in other embodiments only one of these types of wireless transceivers (and possibly neither of these types of wireless transceivers, and/or other types of wireless transceivers) is present.

By virtue of the use of the wireless transceivers 202, the first one 103 of the mobile devices 102 is capable of communicating with the web server 104 (e.g., by way of the communication link 105) and thus indirectly with each of the CPWs 106. Further by virtue of the use of the wireless transceivers 202, the first one 103 of the mobile devices 102 also is capable of communicating directly with the CPWs 106 (such as the first one 109 of the CPWs) by way of direct communication link(s) (such as the communication link 110).

Example operation of the wireless transceivers 202 in conjunction with others of the internal components 200 of the first one 103 of the mobile devices 102 can take a variety of forms and can include, for example, operation in which, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted. The wireless transceiver(s) 202 convey the modulated communication signals by way of wireless (as well as possibly wired) communication links such as the communication links 105, 110 to other devices such as the web server 104 and one or more of the CPWs 106 (as well as possibly to other devices such as a cell tower, access point, or another server or any of a variety of remote devices).

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and light emitting diode indicator, one or more audio output devices 218 such as a speaker, alarm and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as a microphone, and one or more mechanical input devices 226 such as a flip sensor, keyboard, keypad, selection button, navigation cluster, touch pad, capacitive sensor, motion sensor, and switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also can include one or more of various types of sensors 228. The sensors 228 can include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the mobile device 102. While the sensors 228 are for the purposes of FIG. 2 considered to be distinct from the input devices 210, in other embodiments it is possible that one or more of the input devices can also be considered to constitute one or more of the sensors (and vice-versa). Additionally, while in the present embodiment the input devices 210 are shown to be distinct from the output devices 208, it should be recognized that in some embodiments one or more devices serve both as input device(s) and output device(s). For example, in embodiments where a touchscreen is employed, the touchscreen can be considered to constitute both a visual output device and a mechanical input device.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. The data that is stored by the memory portion 206 can include, but need not be limited to, operating systems, applications, and informational data. Each operating system includes executable code that controls basic functions of the mobile device, such as interaction among the various components included among the internal components 200, communication with external devices via the wireless transceivers 202 and/or the component interface 212, and storage and retrieval of applications and data, to and from the memory portion 206. Each application includes executable code that utilizes an operating system to provide more specific functionality, such as file system service and handling of protected and unprotected data stored in the memory portion 206.

As for informational data, this is non-executable code or information that can be referenced and/or manipulated by an operating system or application for performing functions of the mobile device. Additionally, among other things, informational data can include any of a variety of types of information that is uploaded to, downloaded from, or otherwise accessed at the web server 104 or one or more of the CPWs 106 with respect to which the first one 103 of the mobile devices 102 is in communication. As mentioned above, such information can include, for example, personal and/or business information, news information, weather information, pictures, videos, and songs, etc.

Figure 3:
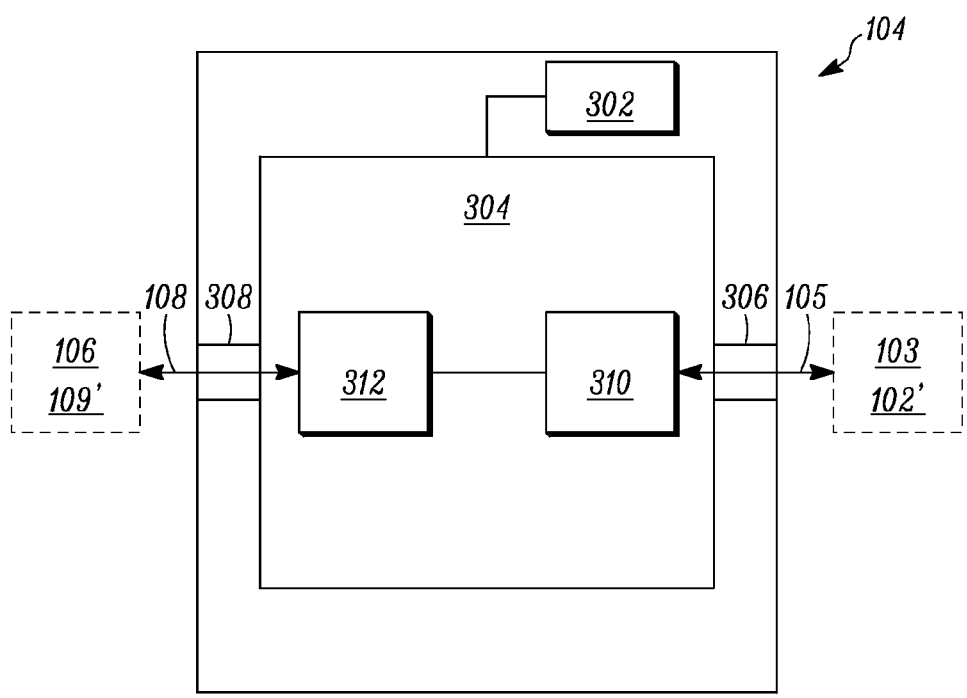
FIG. 3 is a block diagram showing example components of the intermediary server of FIG. 1.

Referring next to FIG. 3, example components of the web server 104 of FIG. 1 are shown in more detail. As shown, the web server 104 includes a memory portion 302, a processor portion 304 in communication with that memory portion, and first and second input/output (I/O) interfaces 306 and 308, respectively, for interfacing the communication links 105 and 108, respectively, with the processor portion 304. In at least some embodiments including the present embodiment, the web server 104 can also be understood to serve as an aggregation server since (as discussed further below) the web server keeps track of and aggregates a variety of information that is from, or that is intended to be provided to or otherwise relates to, multiple ones of the CPWs 106, as well as possibly a variety of information that is from, or that is intended to be provided to or otherwise relates to, multiple ones of the mobile devices 102.

As shown in FIG. 3, the processor portion 304 further includes a front end portion 310 and a back end portion 312. The back end portion 312 communicates with the CPWs 106 such as the first one 109 of the CPWs (shown in dashed lines) via the communication links 108 (one of which is shown) and the second I/O interface 308. In some embodiments, particularly where the CPWs 106 are SNWs, the back end portion 312 can be referred to as a "Social Network Processor". Additionally, the front end portion 310 communicates with the first one 103 of the mobile devices 102 (also shown in dashed lines) via the communication link 105 and the first I/O interface 306. In view of the above discussion, it should further be understood that the front end portion 310 can also be in communication with the others of the mobile devices 102 (other than the first one 103) via additional communication links (not shown).

In at least some embodiments the back end portion 312 supports pull communications with CPWs such as the CPW 106. The pull communications can for example be implemented using Representation State Transfer (REST) architecture, of the type typical to the web. Assuming this to be the case, the back end portion 312 is configured to generate requests for information to be provided to the back end portion from the CPWs 106 (such as the first one 109 of the CPWs) at times/circumstances determined by the web server 104, in response to which the CPWs search for and provide back to the web server requested data. Also, in at least some embodiments the front end portion 310 establishes a push channel in conjunction with the first one 103 of the mobile devices 102. It should be understood that additional push channels can be established with respect to the others of the mobile devices 102 as well.

In at least some such embodiments, the push channel allows the front end portion 310 to provide notifications (generated by the front end portion) from the web server 104 to the first one 103 of the mobile devices 102 at times/circumstances determined by the web server 104, the notifications being indicative of information content that is available to be provided to that mobile device. The first one 103 of the mobile devices 102 in turn is able to respond to the notifications, in manner(s) deemed appropriate by the mobile device. Such responses often (but not necessarily always) constitute requests that some or all of the available information content be provided from the front end portion 310 of the web server 104 to the first one 103 of the mobile devices 102.

The server 104 discussed with reference FIGS. 1 and 3 can take forms depending upon the implementation or embodiment. In at least some circumstances, the server 104 discussed with reference to FIGS. 1 and 3 can be considered a cloud. Further, although FIGS. 1 and 3 show the single server 104, it should be understood that in other embodiments there can be more than one intermediating device constituting a cloud (or implemented in place of the server 104) including, for example, a collection of multiple servers that are in communication with one another and that, in at least some embodiments, support Internet technologies for communication between entities. Also, in at least some embodiments, the server 104 (or corresponding cloud or other intermediating device(s)) can employ web 2.0 functionality and beyond including, for example, further evolution of such functionality and/or new push functionality. Additionally, in some embodiments, the server 104 (or corresponding cloud or other intermediating device(s)) is capable of supporting and creating services and applications for registration, storing and relaying client capabilities and/or preferences, among other things.

Turning now to FIGS. 4-11, a series of schematic block diagrams (see FIGS. 4-7) and flowcharts (see FIGS. 8-11) are provided to illustrate exemplary operation of the system 100 of FIGS. 1-3, particularly example operation in which one of the mobile devices 102 such as the first one 103 of the mobile devices interacts with multiple ones of the CPWs 106 by way of the web server 104 to achieve various goals. Given that the processes represented in FIGS. 8-11 particularly involve the web server 104 interacting with the first one 103 of the mobile devices 102 as well as with the CPWs 106, for convenience of illustration, the steps performed by each of these different devices are shown to be separated into three columns (one for the mobile device, one for the web server, and one for the CPWs) in each of these FIGS. Also for convenience of illustration, it should be understood that the steps shown in FIGS. 8-11 as being performed by a CPW are actually performed by each respective one of the CPWs 106 that are in communication with the web server 104, and further that the steps shown in FIGS. 8-11 as being performed by the web server in relation to a CPW are actually performed by the web server either on a repeated basis with respect to the multiple CPWs or are intended to be representative of steps performed by the web server on a collective basis relative to the multiple CPWs.

Figure 4:
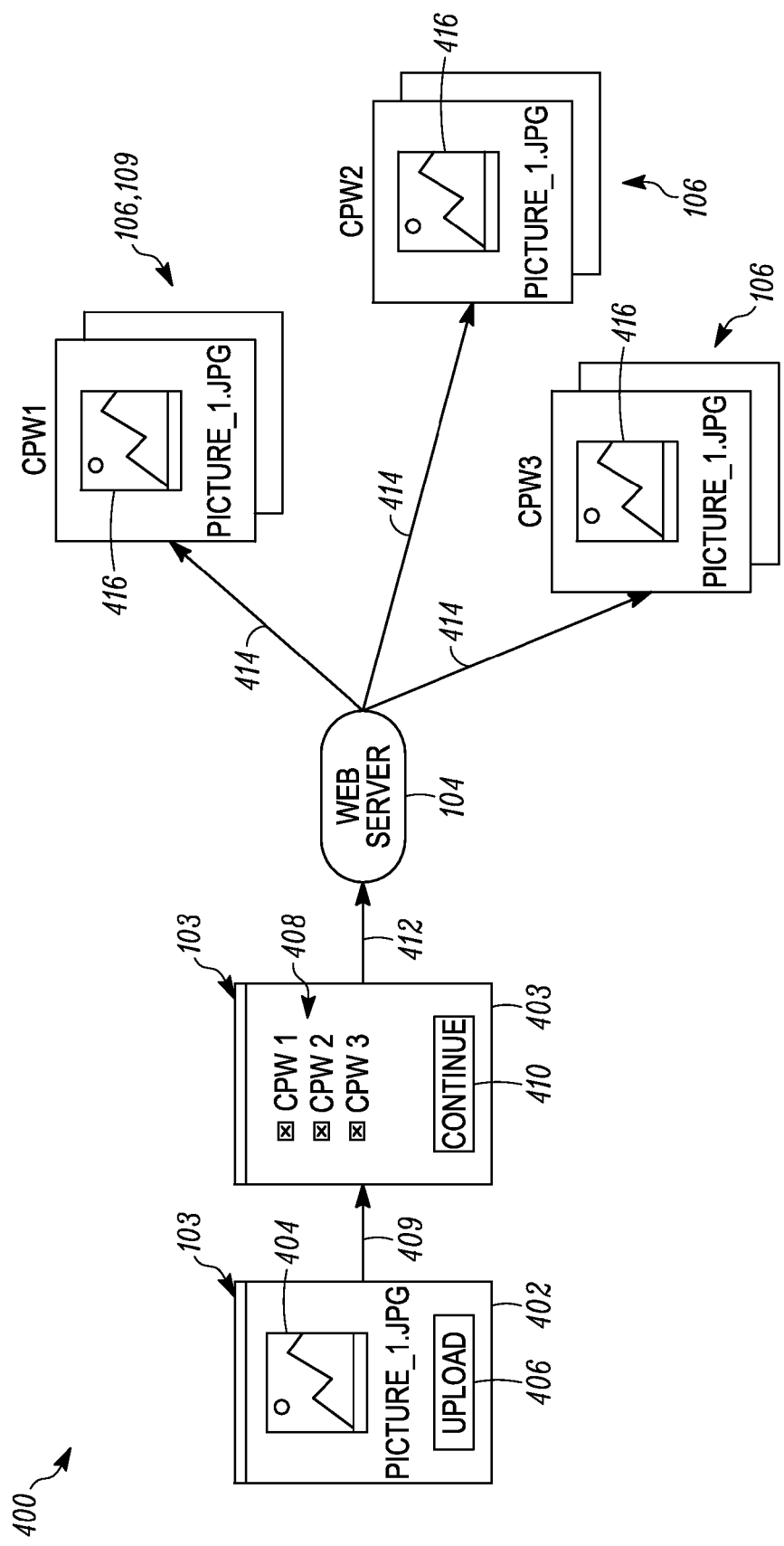
FIGS. 4-7 are block diagrams figuratively illustrating example interactions among some of the components of the system of FIG. 1, in at least some embodiments.
Figure 5:
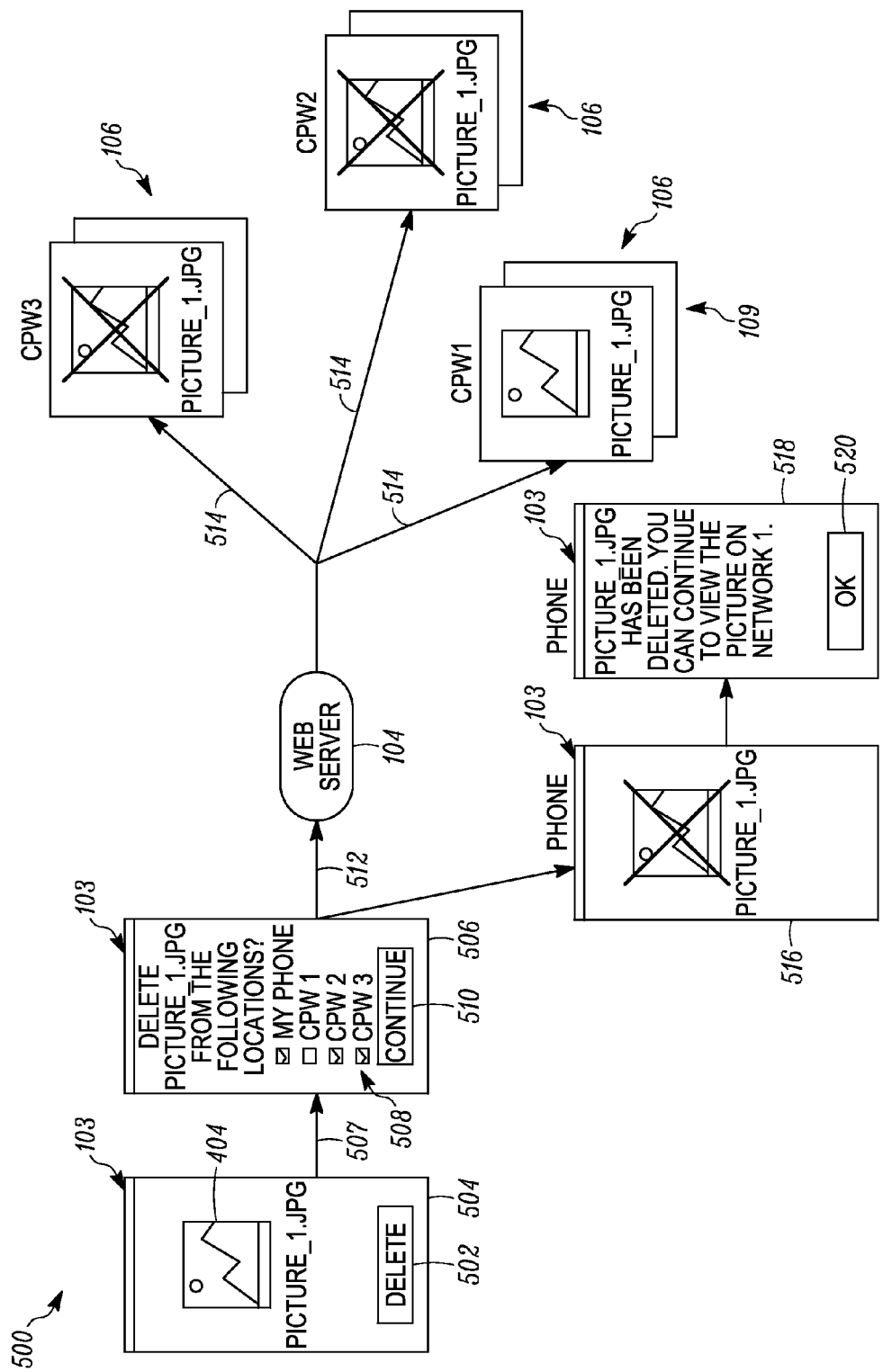
Figure 8:
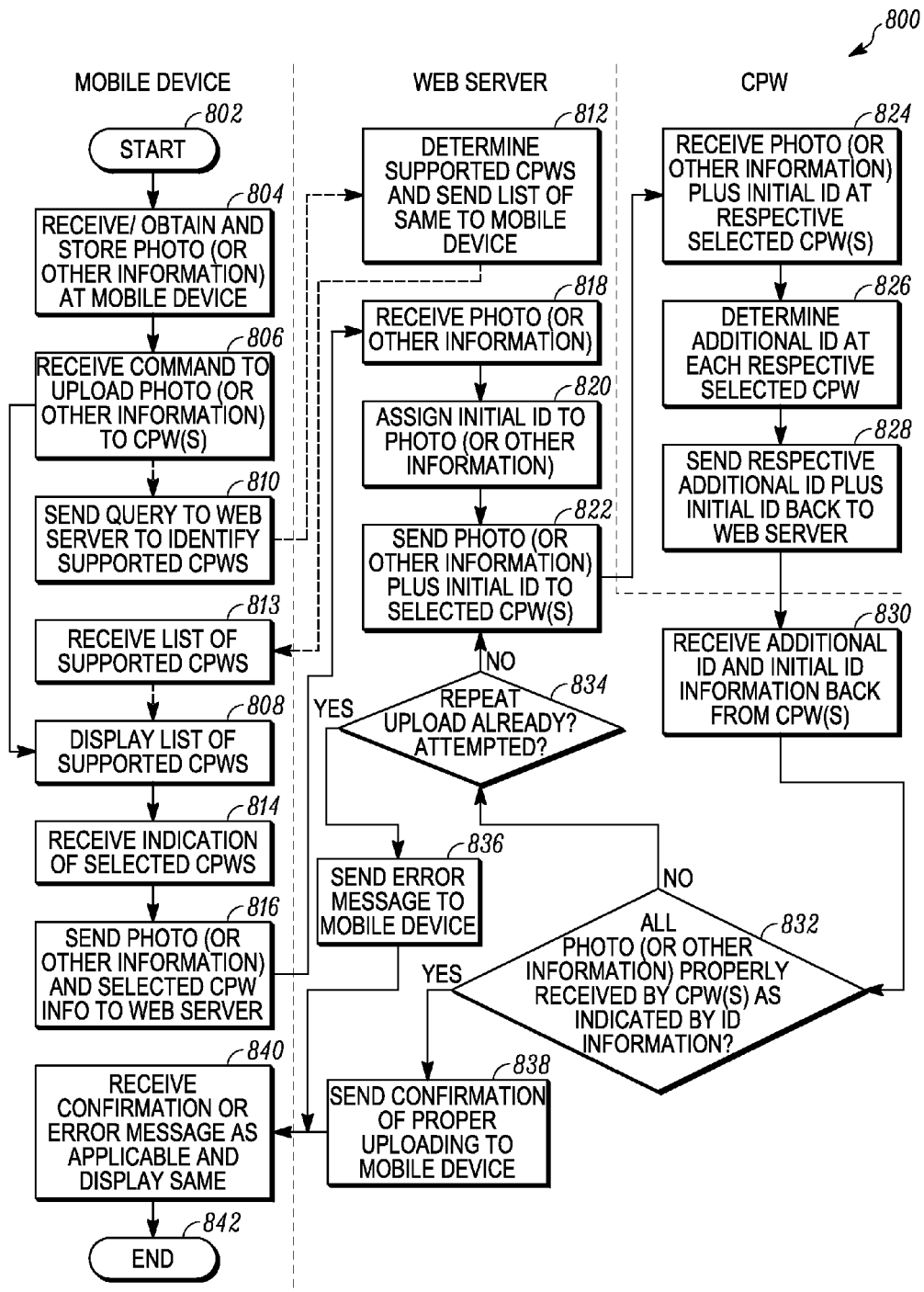
FIG. 8-11 are flow charts showing various example steps of operation of some of the components of the system of FIG. 1 as those components interact with one another in various manners, some of which correspond to the interactions shown in FIGS. 4-7, in at least some embodiments.

More particularly, FIG. 4 shows a schematic block diagram 400 illustrating example operation of the system 100 in which information (in this example, a photo) is uploaded from the first one 103 of the mobile devices 102 to multiple ones of the CPWs 106 by way of the web server 104. Correspondingly, FIG. 8 shows a flowchart 800 illustrating example steps of operation that are performed by the first one 103 of the mobile devices 102, the web (or aggregation) server 104, and each respective one of the CPWs 106 that is involved. By comparison, FIG. 5 shows a schematic block diagram 500 illustrating example operation of the system 100 in which information (again, in this example, a photo) is deleted from multiple ones of the CPWs 106 (as well as from the first one 103 of the mobile devices 102) in accordance with instructions from the first one 103 of the mobile devices 102 by way of the web server 104, while FIG. 9 correspondingly shows a flow chart 900 showing example steps of the mobile device, web server and each CPW in this respect.

Figure 6:
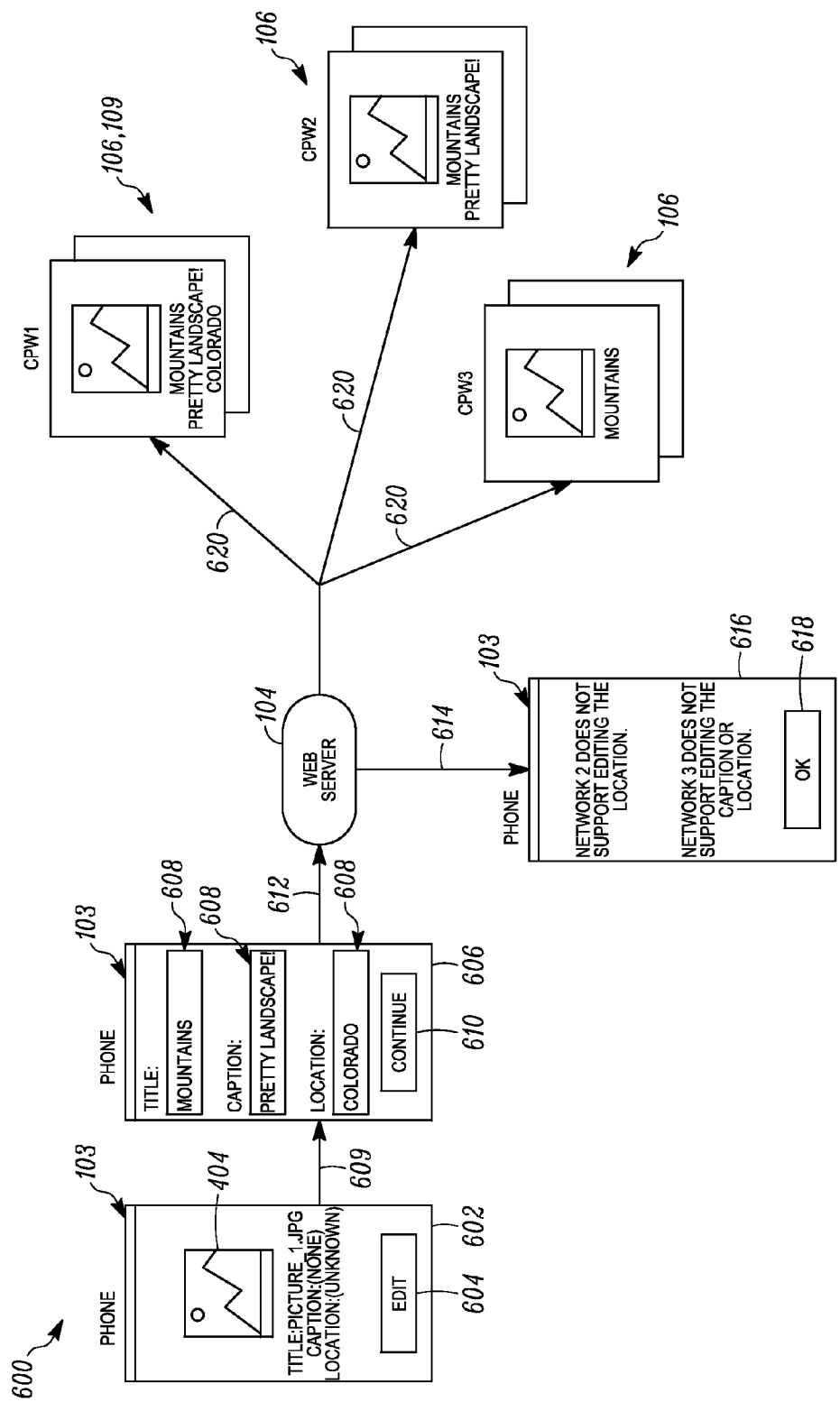
Figure 10:
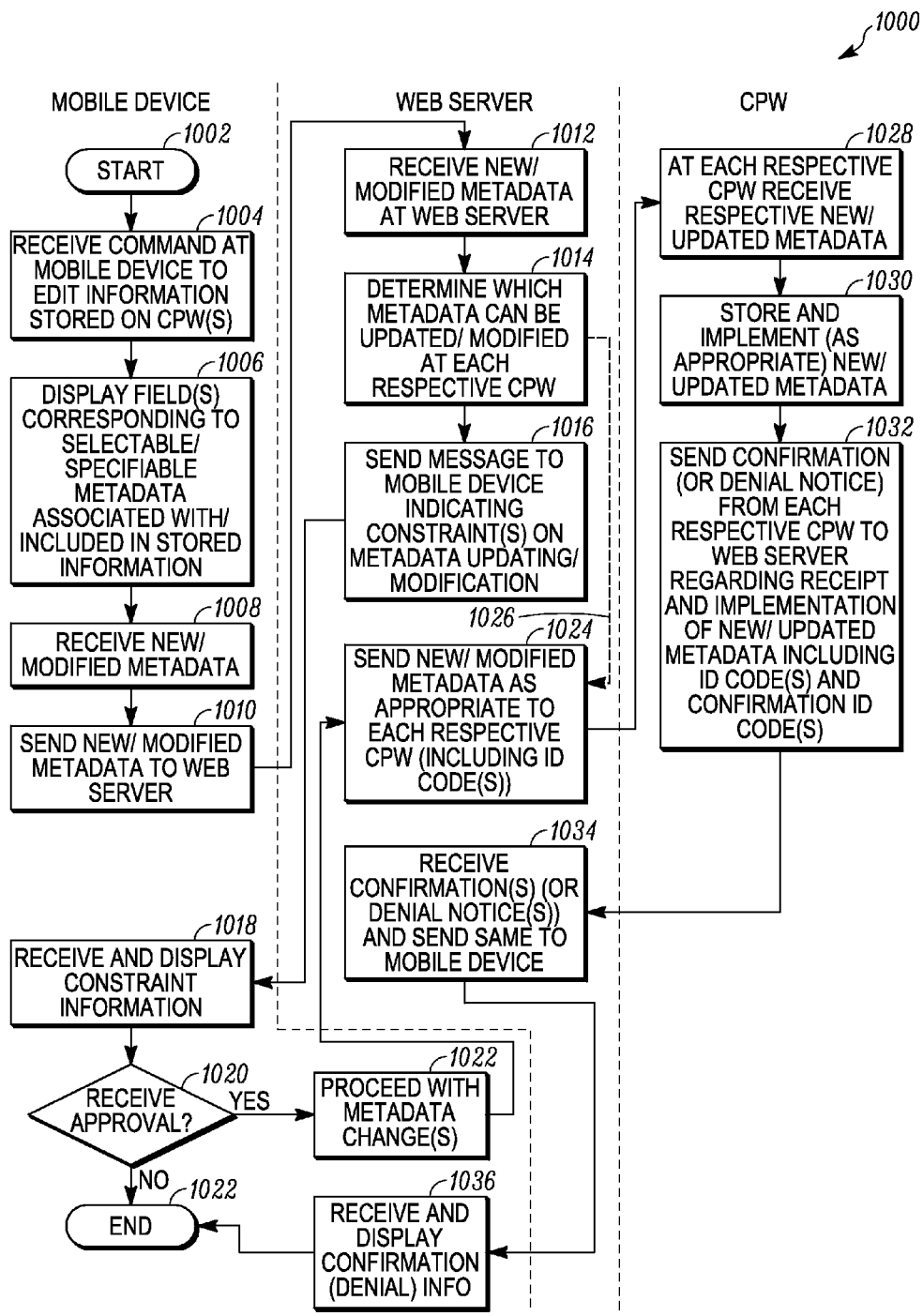
Figure 11:
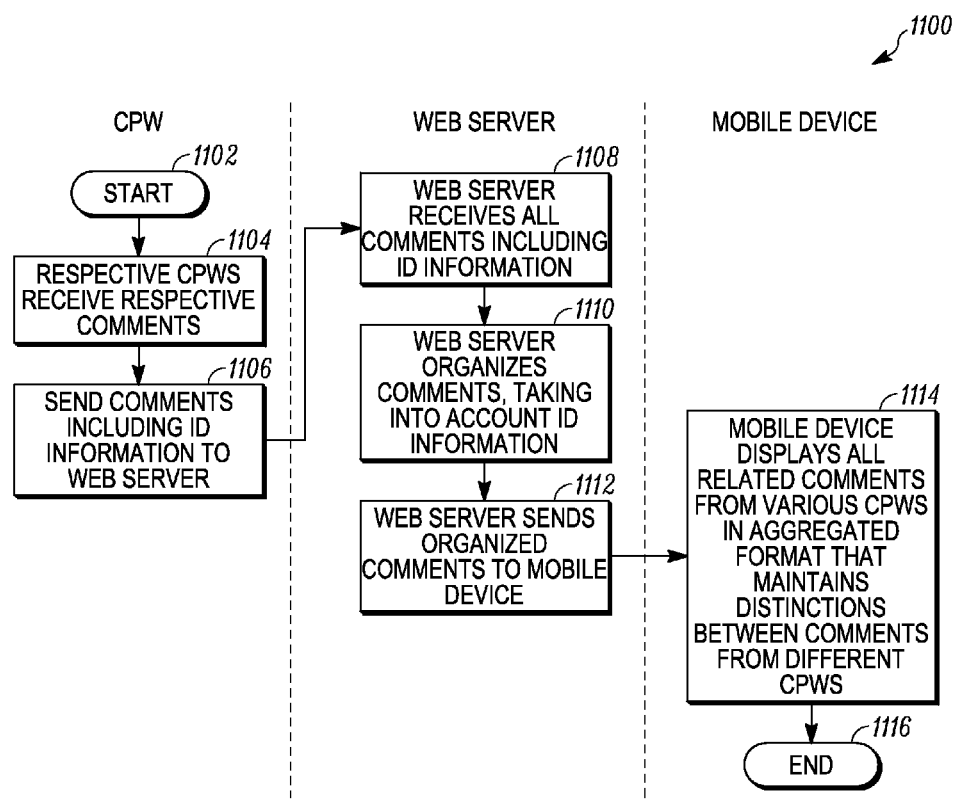

Further with respect to FIG. 6, there is shown a schematic block diagram 600 illustrating example operation of the system 100 in which information stored at multiple ones of the CPWs 106 can be edited based upon instructions received at and provided from the first one 103 of the mobile devices 102 to the web server 104, while FIG. 10 correspondingly shows a flowchart 1000 illustrating example steps of the mobile device, web server, and each CPW in this regard. As for FIG. 7, there is shown a flow chart 700 illustrating example operation of the system 100 in which information received at multiple ones of the CPWs 106 that all relates to a given portion of information (such as a photo) that has been uploaded from the first one 103 of the mobile device 102 is then aggregated and ultimately provided to and displayed by that mobile device. FIG. 11 correspondingly shows a flowchart 1100 portraying example steps of the system 100 as it operates in this manner.

Referring now to FIGS. 4 and 8, in some embodiments of the present invention, the system 100 is configured to facilitate the uploading of information from a given one of the mobile devices 102 such as the first one 103 to multiple ones of the CPWs 106 by way of the web server 104. Particularly with respect to the process shown in FIG. 8, upon starting operation at a start step 802, the first one 103 of the mobile devices 102 receives or otherwise obtains and stores (in this example, as shown in FIG. 4) a photo 404 at a step 804. The photo 404, which is intended to be representative of any of a variety of types of information that can be uploaded depending upon the embodiment or circumstance, can be received from a variety of sources. For example, the photo 404 may have been taken by way of the mobile device 103 itself by way of a camera included as part of the mobile device. By receiving an appropriate input from the user of the mobile device 103, the mobile device video screen can display an image 402 as shown in FIG. 4 in which the photo (or other information of interest) 404 is fully or partly displayed on the screen along with a selectable option button 406. Given such a display, the user of the mobile device 103 is thus able to provide an input by selecting the button 406 indicative of the user's command that the photo 404 be uploaded to one or more of the CPWs 106. Thus, at a step 806 as shown in FIG. 8, the mobile device 103 receives such a command.

At this point, in order to facilitate the user's further specifying of which of the CPWs 106 should receive the photo (or other information) 404 about to be uploaded, it is desirable that the mobile device 103 be able to display for the user a listing of all of the ones of the CPWs 106 with which the mobile device (and/or user) currently are in contact. In some embodiments, it is possible that this information will be regularly stored on the mobile device 103 itself, while in other embodiments this information is obtained instead by contacting the web server 104. Thus, as illustrated in FIG. 8, in the present embodiment upon the completion of the step 806, the listing of supported CPWs 106 is immediately displayed at a step 808. And thus, as illustrated in FIG. 4, such a list 408 of the supported CPWs is displayed in an image 403 on the video screen of the mobile device 103. As represented by an arrow 409, the video screen of the mobile device 103 thus switches from displaying the image 402 to the image 403.

Alternatively, as illustrated by the dashed arrows in FIG. 8, if the supported CPW information is not already available to the mobile device 103 at the step 806, then the process instead advances to a step 810 at which the mobile device sends a query to the web (aggregation) server 104 to identify the supported CPWs 106. Upon receiving that query, the web server 104 at a step 812 in turn determines the supported CPWs and then sends the list of those CPWs back to the mobile device 103. Next, at a step 813, the mobile device 103 then receives that list of supported CPWs back from the web server 104 and thus the process is again able to proceed to the step 808 at which the list 408 of supported CPWs is displayed on the video screen of the mobile device as is shown in FIG. 4.

Once the list 408 of supported CPWs 106 is displayed on the video screen of the mobile device 103, then the mobile device is able to receive from the user an indication of the one or more of those CPWs to which the user wishes the photo (or other information) to be uploaded, at a step 814 as shown in FIG. 8. In the embodiment of FIG. 4, such an indication is received by providing, on the video screen, boxes that can be checked by the user—more particularly, in the example shown in FIG. 4, each of the three CPWs 106 that can be selected from a list are shown to have been selected by the user. Then, upon the user checking the boxes corresponding to one or more of the CPWs 106, upon the user further selecting a continue button 410 also displayed on the video screen of the mobile device 103 (again see FIG. 4), at a step 816 the mobile device 103 sends the photo (or other information) as well as the selected CPW information (that is, the identities of one or more of the CPWs 106 that were selected by the user) to the web server 104. The uploading of the information occurring at the step 816 is indicated by an arrow 412 shown in FIG. 4 pointing to the web server 104.

As further shown in FIG. 8, upon the web server 104 receiving the photo (or other information) at a step 818, at a subsequent step 820 the web server assigns an initial identification code or initial ID to the photo (or other information) that has been received. Upon assigning the initial ID, then at a step 822 the photo (or other information), in combination with the initial ID, is sent to the selected ones of the CPWs 106. The sending operation at the step 822 is represented by additional arrows 414 shown in FIG. 4.

Subsequently, at a step 824 of FIG. 8, the respective selected ones of the CPWs 106 receive the photo (or other information) plus the initial ID information sent at the step 822. The receipt of the photo (or other information) plus the initial ID at the step 824 is reflected in FIG. 4, which shows three of the CPWs 106 including the first one 109 of the CPWs as having received the photo 404. Typically this information is then stored at the respective selected ones of the CPWs 106. It should be noted that, although FIG. 8 shows certain steps as being performed by a given one of the CPWs 106 (e.g., the first one 109), the same steps are envisioned as being performed at each of the CPWs that have been selected at the step 814 and to which the photo (or other information) plus initial ID information is sent at the step 822. That being the case, at a next step 826, at each of the selected ones of the CPWs 106, an additional ID is determined or generated. Further, at a step 828, each respective one of the selected CPWs 106 sends, as a response to the web server 104, the respective additional ID generated at the step 826 by that respective one of the CPWs 106, plus the initial ID that was provided from the web server 104 at the step 822, back to the web server.

Upon the sending of the additional ID plus the initial ID information back to the web server 104 at the step 828, then at a step 830 the web server receives that information back from the respective selected ones of the CPWs 106. Further, at a step 832, the web server 104 determines whether all photo (or other information) that was sent at the step 822 has been properly received by the selected ones of the CPWs 106. This can be determined based upon the ID information, more particularly, the additional ID and initial ID information received back from the CPWs at the step 830. In the present embodiment, the mere receipt of additional ID information from the respective selected ones of the CPWs 106 can itself be indicative of the successful receipt by those CPWs (respectively and/or collectively) of the information sent at the step 822. However, in other embodiments, the additional ID information is coded so as to properly indicate, in a manner recognized by the web server 104, that the information uploaded at the step 822 has been properly received—absent proper coding being included in the additional ID information provided from a given CPW, the web server 104 will assume that the information sent to that CPW at the step 822 was not properly received. In some cases further, the additional ID information is particularly coded in a manner understood by the web server 104 as indicating the identity of the one of the CPWs 106 from which that additional ID information was provided.

If at the step 832, it is determined that one or more of the intended (that is, selected) ones of the CPWs 106 did not successfully receive the uploaded information, the web server 104 determines whether a repeat upload was already attempted at an earlier time, at a step 834. If no repeat upload was already attempted, then the web server 104 returns to the step 822 at which it attempts again to send the photo (or other information) plus the initial ID information to the selected CPWs. It should be understood that, although a first attempt at sending the photo (or other information) and initial ID information at the step 822 will typically involve sending of that information to each of the ones of the CPWs 106 that were originally selected at the step 814, when an upload is repeated as a consequence of the steps 832 and 834 then the photo (or other information) and initial ID information sent at the step 822 will often only be sent to that one or more of the CPWs 106 at which the first upload was unsuccessful. Further, if at the step 834 it is determined that a repeat upload was already attempted once before, then instead of proceeding back to the step 822, the web server 104 advances from the step 834 instead to a step 836, at which it sends an error message to the mobile device 103 indicating that one or more of the CPWs 106 that were earlier selected were unable to receive the intended photo (or other information).

Alternatively, if at the step 832 it is determined that all of the photo (or other information) and initial ID information transmitted at the step 822 was properly received by all of the selected ones of the CPWs 106 as indicated by the ID information, then the web server proceeds from the step 832 to a step 838 at which the web server 104 sends to the mobile device 103 a confirmation that proper uploading to the CPWs took place. Upon the sending of the error or confirmation messages at the steps 836 or 838, then at a step 840 the first one 109 of the mobile devices 106 receives those message(s) as applicable and displays whether the information was properly uploaded or not for viewing by the user, after which at a step 842 the process is ended.

Figure 9:
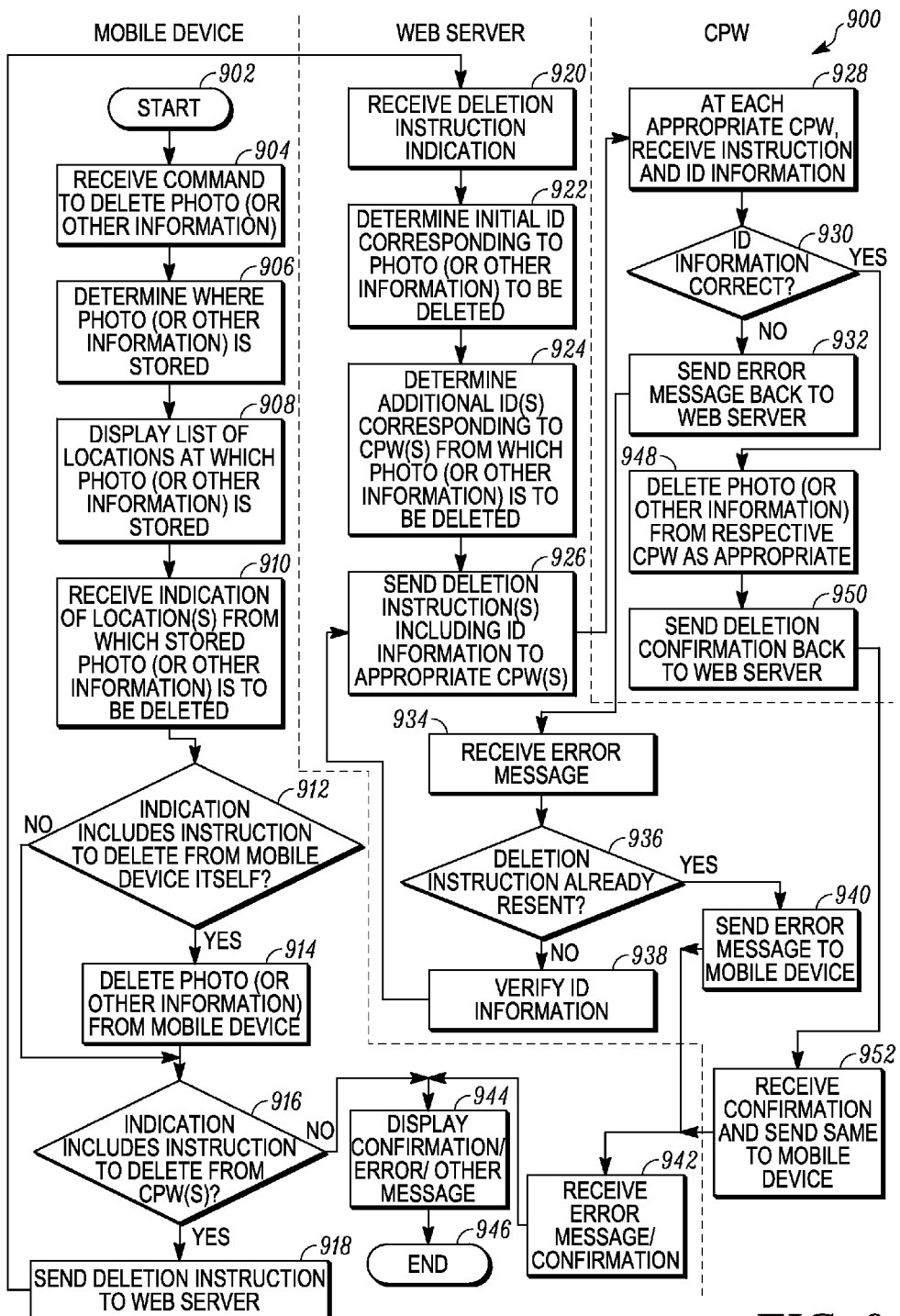

Turning to FIGS. 5 and 9, additional operations of the system 100 are shown by which a photo (or other information), such as the photo 404 uploaded as a result of the operations discussed above with respect to FIGS. 4 and 8, is deleted from the first one 103 of the mobile devices 102 and also deleted from certain ones of the CPWs 106 from which it had earlier been uploaded. The deletion process begins at a step 902 of the flowchart 900 of FIG. 9, which is the start step, subsequent to which at a step 904 the first one 103 of the mobile devices 102 receives a command to delete the photo (or other information) 404. As illustrated in FIG. 5, the command to delete the photo (or other information) 404 can be provided by a user to the first one 103 of the mobile devices 102 by selecting a delete button 502 displayed on an image 504 provided on a video screen of the mobile device that also shows the photo (or other information) 404 potentially about to be deleted.

Upon receiving the command to delete the photo (or other information) at the step 904, at a step 906 the first one 103 of the mobile devices 102 then determines where the photo (or other information) 404 is stored. Typically, upon the uploading of the photo (or other information) 404 as discussed with reference to FIGS. 4 and 8, that photo (or other information) will be stored on the mobile device that performed the uploading as well as one or more of the CPWs 106 to which it was uploaded. In some cases, the photo (or other information) can also be stored on the web server 104, although it is not necessary. Regardless of the location(s) at which the photo (or other information) 404 is stored, in the present embodiment it is envisioned that the first one 103 of the mobile devices 102 has (or at least is able to readily access) a record of where the photo (or other information) has been stored. The record of where the information has been stored, in terms of the CPWs 106 and/or other locations at which it has been stored, can for example have been previously provided from the web server 104 back to the first one 103 of the mobile devices 102 upon the uploading being completed, e.g., at the receiving of the confirmation or error messages in accordance with the step 840 of FIG. 8 as discussed above. In alternate embodiments, in order to obtain the record of the locations at which the photo (or other information) 404 has been stored, the first one 103 of the mobile devices 102 will need to contact the web server 104.

Upon determining where the photo (or other information) 404 is stored at the step 906, then at a next step 908 the first one 103 of the mobile devices 102 displays a list of the location(s) at which the photo (or other information) is stored, on the video screen of the mobile device. The listing can be displayed in a variety of manners. For example, in the present embodiment as shown in FIG. 5, an additional video screen image 506 is displayed on the first one 103 of the mobile devices 102 that lists all of the locations at which the photo (or other information) 404 has been stored, namely, in this case, the first one 103 of the mobile devices itself as well as three of the CPWs 106. As indicated by an arrow 507, the video screen is switched from displaying the image 504 to displaying the image 506.

In addition to the displaying of the list of locations at which the photo (or other information) 404 is stored, at a step 910 of the process represented by the flowchart 900, the first one 103 of the mobile devices 102 additionally receives an indication of one or more of those location(s) from which the photo (or other information) should be deleted. The indication can be provided to the first one 103 of the mobile devices 102 by a user in a variety of manners depending upon the embodiment. In the embodiment of FIG. 5, for example, the additional video screen image 506 includes not only a listing of the locations at which the photo (or other information) 404 is stored but also selectable boxes 508 adjacent to each of the locations at which the photo (or other information) is stored, plus a continue button 510. The user thus is provided with an opportunity to specify, by checking one or more of the selectable boxes 508, those of the locations at which the photo (or other information) 404 is stored from which the user wishes the photo (or other information) to be deleted, and then to further indicate approval of the selections by pressing the continue button 510.

Upon completion of the step 910, the process of FIG. 9 then advances to a step 912, at which the first one 103 of the mobile devices 102 determines whether the indication provided at the step 910 includes an instruction to delete the photo (or other information) 404 from the first one 103 of the mobile devices 102 itself. If at the step 912 it is determined that there was an instruction to delete the photo (or other information) 404 from the first one 103 of the mobile devices 102 itself, then the process advances to a step 914, at which the photo (or other information) is deleted from that mobile device. If instead at the step 912 it is determined that there was no instruction to delete the photo (or other information) 404 from the first one 103 of the mobile devices 102 itself, then the process advances to a step 916, as does the process upon the completion of the step 914 as well. At the step 916, the first one 103 of the mobile devices 102 further determines whether the indication received at the step 910 included an additional instruction or instructions to delete the photo (or other information) 404 from one or more of the CPWs 106. If no such additional deletion instruction(s) were received, then the process advances to a step 944, at which the first one 103 of the mobile devices 102 indicates what deletion (if any) has taken place, and after which the process ends at a step 946. Alternatively, if there were such additional deletion instruction(s), then at a further step 918 those deletion instruction(s) are sent from the first one 103 of the mobile devices 102 to the web server 104, as further illustrated by an arrow 512 shown on FIG. 5.

Upon the sending of the deletion instruction(s) to the web server 104, then at a step 920 the web server receives that deletion instruction indication. Then, at a step 922, the web server 104 determines an initial ID corresponding to the photo (or other information) 404 to be deleted. Such an initial ID can be the initial ID set earlier when the photo (or other information) 404 was first uploaded, for example at the step 820 of FIG. 8. Additionally, at a step 924, the web server 104 further determines the additional ID or IDs corresponding to those of the CPW(s) 106 from which the photo (or other information) 404 is to be deleted. Such additional ID information can be all or a portion of the additional ID information that was received by the web server 104 at the step 830 of FIG. 8.

It should be understood that the initial ID information determined at the step 922 can typically be determined by the web server 104 based upon the instructions provided from the mobile device at the step 918. That is, when sending the instruction to the web server 104 at the step 918, the first one 103 of the mobile devices 102 typically includes the initial ID information along with the instructions identifying the particular ones of the CPWs 106 from which the photo (or other information) 404 is to be deleted. In some cases, the information provided from the first one 103 of the mobile devices 102 further includes the additional ID information determined at the step 924. Alternatively, in other embodiments the instructions from the first one 103 of the mobile devices 102 sent at the step 918 merely identify those of the CPWs 106 from which the photo (or other information) 404 is to be deleted in some other manner, and it is then the web server 104 that determines the additional ID information at the step 924 based upon those instructions, for example, by consulting data stored in the memory portion 302 of the web server 104.

Upon determining the ID information at the steps 922 and 924, the web server 104 is then ready to send deletion instructions to appropriate ones of the CPWs 106 corresponding to the instructions received from the first one 103 of the mobile devices 102, and does so at a step 926. In sending the deletion instructions at the step 926, the web server 104 also typically sends the ID information (both initial and additional ID information) corresponding to the appropriate ones of the CPWs 106 from which the photo (or other information) 404 is to be deleted, since that ID information can then be used by the CPWs themselves to verify the appropriateness of executing the deletion instructions. The sending of the deletion instructions at the step 926 is represented figuratively in FIG. 5 by arrows 514.

Upon the sending of the deletion instructions at the step 926, then at a subsequent step 928 each of the appropriate ones of the CPWs 106 to which the instructions were sent in turn receives such instructions and associated ID information. Next, at a step 930, each respective one of the CPWs 106 that received the instruction(s) (and ID information) determines whether the received ID information is correct in terms of corroborating that the respective CPW should in fact perform the instructed deletion. Among other things in this regard, the respective CPW 106 can verify that the additional ID information corresponds to the additional ID information previously generated by that CPW in relation to the photo (or other information) 404 of interest at the step 826 of FIG. 8, as well as verify that the additional ID information corresponds to the initial ID information received.

If at the step 930 it is determined by a respective one of the CPWs 106 that the ID information does not corroborate that the deletion instruction should be performed, then the process advances from the step 930 to a step 932, at which an error message is sent by that respective one of the CPWs back to the web server 104. If such an error message is sent and consequently received by the web server 104 at a step 934, then the web server in turn at a step 936 determines whether such an error message has already been received once before from that respective CPW and whether as a consequence the deletion instruction was already resent to that respective CPW. If the deletion instruction was not already resent at an earlier time, then the process advances further to a step 938 at which the web server 104 attempts to verify whether the ID information sent with the deletion instructions at the step 926 earlier was in fact correct and, if not, corrects that ID information. Then, in such circumstance, the process repeats the step 926 such that the deletion instructions previously sent are resent to the respective CPW from which the error message was received at the step 934, and consequently the steps 928-930 are also repeated. Alternatively, if at the step 936 it is determined by the web server 104 that the deletion instruction was already resent once, then the web server presumes that the error in accomplishing the deletion cannot be rectified and thus sends an error message to the first one 103 of the mobile devices 102 from which the original deletion instruction was received, at a step 940. In response, at a step 942 the first one 103 of the mobile devices 102 receives that error message and at a step 944 then displays the error message on the video screen of the mobile device, after which the process is ended at a step 946.

Returning back to the step 930, if alternatively it is determined by a respective one of the CPWs 106 (among those which received deletion instructions at the step 928) that the received ID information is correct, then that CPW instead proceeds to a step 948 at which that respective CPW deletes the photo (or other information) 404 from its memory in accordance with the received deletion instructions. Upon the deletion being performed, then that respective one of the CPWs 106 further sends a confirmation of the deletion back to the web server 104 at a step 950. That confirmation in turn is received by the web server 104 at a step 952, at which the web server in turn sends the confirmation back to the first one 103 of the mobile devices 102. The confirmation in turn is received by the first one 103 of the mobile devices 102 at the step 942, in response to which the mobile device displays in this case the confirmation message at the step 944 prior to the process ending at the step 946.

The displaying of the confirmation/error/other messages at the step 944 can occur in a variety of manners depending upon the embodiment. FIG. 5 illustrates one example in which, assuming that all requested deletions have been properly accomplished, the video screen of the first one 103 of the mobile devices 102 is controlled to display confirmation information. More particularly, FIG. 5 illustrates in a figurative manner operation in which the deletion of the photo 404 is performed at each of second and third ones of the CPWs 106 but not the first one 109 of the CPWs (at which the photo is to remain), as is represented by the Xs through the photo 404 shown to be associated with two out of the three CPWs but not the third. Given that these deletions were properly performed, FIG. 5 further shows how in response the video screen of the first one 103 of the mobile devices 102 can display two images in succession, namely, a first image 516 showing an X through the photo 404 that was deleted from the second CPW, the third CPW, and the first one 103 of the mobile devices 102 itself, followed by a second image 518 stating that the deletion has been performed and further reminding the user that notwithstanding these deletions the photo continues to be stored and available on the first one 109 of the CPWs 106. Once the image 518 is displayed, an OK button 520 also shown on that image can be selected by the user to complete the deletion process.

Notwithstanding the images 516, 518 of FIG. 5, the confirmation/error/other message information displayed according to the step 944 of FIG. 9 can also take other forms. For example, in the case where none of the requested deletions were properly performed, the video screen of the first one 103 of the mobile devices 102 can indicate that fact. Also, if the deletions were properly performed at certain ones of the CPWs 106 but not others, the message displayed by the first one 103 of the mobile devices can indicate that circumstance as well.

Turning next to FIGS. 6 and 10, additional operations of the system 100 are shown that allow for editing of information stored at one or more of the CPWs 106, which in this example is the photo (or other information) 404 previously uploaded from the first one 103 of the mobile devices 102 as discussed with reference to FIGS. 4 and 8. Referring particularly to FIG. 6, upon the process represented by the flowchart 1000 beginning at a start step 1002, at a step 1004 the first one 103 of the mobile devices 102 receives a command from the user that the photo (or other information) 404 previously stored and uploaded should be edited. For example, as illustrated in FIG. 6, the first one 103 of the mobile devices 102 can cause its video screen to display an image 602 on which is shown both particular information that was previously uploaded (e.g., the photo 404 shown earlier with respect to FIGS. 4 and 5 including certain associated metadata or other associated information) and also a selectable edit button 604 that, upon being pressed by the user, constitutes the command to edit the stored information in accordance with the step 1004.

Next, at a step 1006, the first one 103 of the mobile devices 102 additionally displays one or more fields pertaining to selectable/specifiable items corresponding to the photo 404 previously uploaded. Typically, these selectable/specifiable items are metadata items associated with the photo 404 that can be modified or set by the user. Again with respect to FIG. 6, for example, assuming that there are three metadata items associated with the photo 404 concerning title information, caption information, and location information corresponding to the photo, the first one 103 of the mobile devices 102 can be switched from displaying the image 602 to displaying another image 606 showing fields 608 for title information, caption information and location information, respectively. The switching from displaying the image 602 to the other image 606 is represented by an arrow 609, shown in FIG. 6. Upon the fields 608 being displayed at the step 1006, then at a subsequent step 1008 the first one 103 of the mobile devices 102 further receives new/modified metadata into those fields. Again for example, with respect to the photo 404 shown in FIG. 6, the user can specify as shown the terms "Mountains" for the title, the term "Pretty landscape!" for the caption, and the term "Colorado" for the location. The information entered into the fields 608 is particularly received by the first one 103 of the mobile devices 102 after the user presses a continue button 610 shown in the image 606. Upon receiving the new/modified metadata, then at a step 1010 of FIG. 10 the first one 103 of the mobile devices 102 sends that new/modified metadata to the web server 104. The sending of this new/modified metadata is also indicated by an arrow 612 of FIG. 6.

Subsequently, at a step 1012, the new/modified metadata is received by the web server 104. It should be understood that, although certain ones of the CPWs 106 can potentially allow for metadata entries or changes with respect to various information such as the photo 404 stored thereon, other ones of the CPWs need not allow such updates or changes. Therefore, in attempting to achieve editing of the information stored on the CPWs 106, the web server 104 in the present embodiment upon receiving the metadata change request at the step 1012 in turn at a subsequent step 1014 determines which metadata can in fact be updated/modified at each respective one of the CPWs 106 that has stored the photo or other information to which the requested metadata updates/changes apply (e.g., the photo 404). In the present embodiment, this determination regarding which of the CPWs 106 support certain metadata updates/changes is made based upon additional information already available at the web server 104 itself, and therefore in the present embodiment the determination made at the step 1014 can be made by the web server without consulting (or taking any steps to consult) other entities such as the CPWs 106. That said, in alternate embodiments, it can be appropriate at this time for the web server 104 to contact the appropriate ones of the CPWs 106 to obtain further clarification or information regarding whether those CPWs allow for metadata updates/modifications.

Regardless of how the determination at the step 1014 is made, upon completion of that determination, then at a step 1016 the web server 104 sends a message back to the first one 103 of the mobile devices 102 indicating any constraints that exist on metadata updating/modification as determined at the step 1014. Upon receiving this message at a step 1018, the first one 103 of the mobile devices 102 displays this constraint information (also at the step 1018 shown in FIG. 10). Further for example in this regard, FIG. 6 illustrates operation in which the web server 104 determines that, while the first one 109 of the CPWs 106 is capable of accepting updated/modified metadata with respect to each of the title, caption and location pertaining to the stored photo 404 information, second and third ones of the CPWs do not support editing of the location metadata while the third CPW in particular does not support editing of either the caption or location information. Thus, upon receiving this constraint information as illustrated by an arrow 614 from the web server 104, the first one 103 of the mobile devices 102 displays an image 616 representative of these constraints.

Upon the displaying of the constraint information at the step 1018, the user is offered an opportunity to determine whether or not the requested metadata updates/changes should still be attempted notwithstanding the constraints indicated, that is, whether or not the requested metadata changes should still be performed where possible even though the changes cannot be performed at all of the CPWs. Authorization to proceed with the metadata changes can be provided at a step 1020 by way of a user selecting a button such as an OK button 618 as shown in the image 616 of FIG. 6 after reviewing the constraint information. If approval is not granted by the user at the step 1020, then the process ends at an end step 1022. Alternatively, if notwithstanding the constraint information the user indicates approval (e.g., by selecting the OK button 618), a proceed command is then further sent at a step 1022 by the first one 103 of the mobile devices 102 back to the web server 104.

The process then advances to a step 1024, at which the web server 104, upon receiving the further instruction to proceed with the metadata changes, sends the new/modified metadata as appropriate to each respective one of the CPWs 106 in which the photo (or other information) 404 to which the metadata pertains is stored. In the present embodiment, sending of this new/modified metadata is accompanied by the sending of the initial and/or additional ID information discussed above (e.g., with respect to the steps 820 and 826 of FIG. 8). It should be noted that, although in the present embodiment it is presumed that the process advances from the step 1014 to the step 1024 by way of the intermediate steps 1016-1022, in some circumstances there will not be any constraints on metadata updating/modification and, in such embodiments, the process can advance directly from the step 1014 to the step 1024 as represented by the dashed arrow 1026.

Upon the sending of the new/modified metadata to the CPWs 106, then at a further step 1028 each respective one of the CPWs in turn receives the respective new/updated metadata. Such transmission of the new/modified metadata is illustrated in FIG. 6 by arrows 620 extending from the web server 104 to three of the CPWs 106. Upon receiving that metadata at the step 1028, each one of the respective CPWs 106 that received the metadata stores and implements as appropriate the new/updated metadata at a step 1030. It should be understood that the storing and implementing of the new/updated metadata at the step 1030 reflects any constraints already identified at the step 1014. Thus, in the illustration provided in FIG. 6, where the second of the CPWs 106 does not support editing location information and the third of the CPWs does not support editing the caption or location information, the second CPW is shown as only including "Mountains" as the title information and "Pretty landscape!" as the caption information, while the third CPW is shown as only including "Mountains" as the title information. By comparison, the first one 109 of the CPWs 106 is shown as having implemented all of the requested metadata changes, such that it includes "Mountains" as the title information pertaining to the photo 404, "Pretty landscape!" as the caption information, and "Colorado" as the location information.

Upon completion of the storing and implementing of the new/updated metadata at the step 1030, the process then advances to a step 1032, at which each of the respective ones of the CPWs 106 sends a confirmation (or denial) notice to the web server 104 regarding that CPW's successful receipt and implementation of the new/updated metadata. This confirmation (or denial) notice can include ID codes such as the initial or additional ID codes discussed above, or other ID codes. Upon the web server 104 receiving such confirmation (or denial) notices from the various CPWs 106, the web server sends that information back to the first one 103 of the mobile devices 102 at a further step 1034. Finally then, at a step 1036, the first one 103 of the mobile devices 102 receives and displays that confirmation (or denial) information, at which point the process ends at the step 1022.

Figure 7:
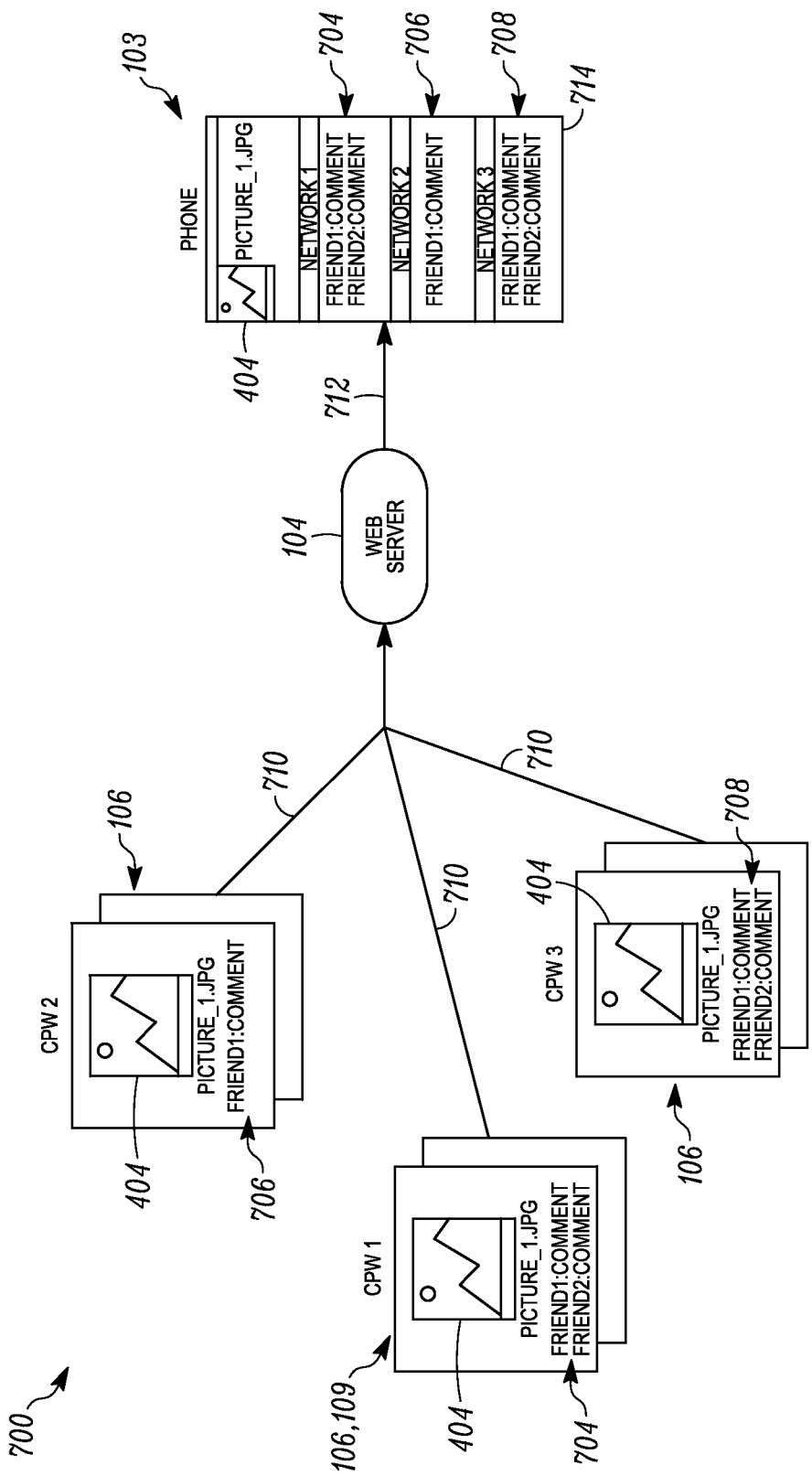

Turning now to FIGS. 7 and 11, in at least some embodiments of the present invention the system 100 is further able to perform operations by which comments or other input information received by the CPWs 106 in relation to a given photo (or other information) stored at those CPWs is aggregated or consolidated at the web server 104. Upon being consolidated at the web server 104, the information can then be further provided to one or more of the mobile devices 102 such as the first one 103 of the mobile devices for presentation to user(s) of those mobile device(s). The information provided to the mobile device(s) 102 is provided in an organized format that allows for the user(s) to observe such information received at the multiple CPWs and relating to the same photo (or other information) in a simplified manner.

In particular, FIG. 11 shows a flow chart 1100 representing a process that begins at a step 1102. Upon starting at the step 1102, the respective ones of the CPWs 106 that have each stored a given portion of information provided by a given mobile device such as first one 103 of the mobile devices 102 (such as the photo 404 discussed above), receive respective comments or other input information all relating to that given portion of information. Such comments can be provided from a variety of sources and typically they are provided by third parties who are different from the user of the first one 103 of the mobile devices 102 but who are nevertheless interacting with the CPWs 106. For example, as illustrated in FIG. 7, in one circumstance it is the case that the first one 109 of the CPWs 106 on which is stored the photo 404 has received first and second comments 704 from first and second friends while the second one of the CPWs has received only a first comment 706 from the first friend and the third one of the CPWs has received in relation to the same photo 404 an additional two comments 708 from first and second friends. For purposes of this example, it should be understood that the first comments received from the first friend at the different CPWs are actually different respective comments, and also that the two comments received from the second friend at the first and third CPWs are different from one another.

As the CPWs 106 receive comments respectively, those comments are then sent by the CPWs to the web server 104 at a step 1106, as further represented in FIG. 7 by arrows 710. As a result, at a step 1108 shown at FIG. 11, the web server 104 can be said to have received all of the relevant comments (or other input information) corresponding to a given uploaded photo or other information such as the photo 404. Although FIG. 11 shows the receiving of comments (or other input information) and the forwarding of such comments (or other input information) to the web server 104 as singular steps that are each respectively performed by all of the CPWs 106 collectively at once, it should be understood nonetheless that typically these steps will in practice be performed on a repeated and ad hoc basis as the various CPWs 106 independently receive comments (or other input information) and report, on an on-going basis, the arrival of these comments (or other input information) corresponding to the uploaded photo (or other information) 404. Thus the execution of the step 1108 of FIG. 11 can also be considered to be something which is performed on an ongoing and repeated basis rather than performed only once. Also, although not shown, in alternate embodiments it is possible that the web server 104 will send out polling requests occasionally to the various CPWs 106 to obtain, at respective times in response to the respective polling requests, specific updates as of those times from the respective CPWs regarding comments (or other input information) that have been provided in relation to a given uploaded photo or other information such as the photo 404. Nevertheless, such polling need not be performed in every embodiment, and is not performed in the present embodiment.

Upon receiving all of the relevant comments (or other input information), or on an ongoing basis as more comments are received, at a step 1110 the web server 104 organizes the received comments. In embodiments where comments are received on an ongoing basis, there can be repeated or continual organizing or reorganizing. The manner of organizing can be based upon various criteria, such as the source (e.g., the CPW) from where the various comments have arrived as well as the photo (or other information) to which those comments pertain. Then, at a step 1112, the web server 104 sends the comments, in the organized format, to the mobile device from which the photo (or other information) to which the comments pertain was originally uploaded, e.g., the first one 103 of the mobile devices 102 from which the photo 404 was uploaded. Transmission of this information is represented figuratively in FIG. 7 by an arrow 712.

Finally, upon the organized comments being received by the first one 103 of the mobile devices 102, that mobile device at a step 1114 displays all of the related comments (or other input information) from the various CPWs 106 in the organized manner determined by the web server 104. In the present embodiment, the manner of display shows all of the comments corresponding to a particular uploaded photo or other information (e.g., the photo 404 shown on FIG. 7) in an aggregated format. That is, all of the comments from all of the CPWs 106 to which the photo or other information had previously been uploaded are shown together in relation to that photo or other information. One example of such a manner of display is shown in FIG. 7, which shows an image 714 that is displayed on the video screen of the first one 103 of the mobile devices 102 from which the photo 404 stored on the CPWs 106 had earlier been uploaded. As shown, in this image 714, beneath the photo 404 to which received comments relate, are displayed the comments 704 received from the first one 109 of the CPWs 106. Additionally, beneath the comments 704, the comment 706 received from the second of the CPWs and the comments 708 received from the third of the CPWs are shown sequentially. Thus, given this manner of presentation, the user of the first one 103 of the mobile devices 102 is able to see, by virtue of the image 714 all by itself, all of the comments from all of the CPWs 106 to which the photo 404 was previously uploaded in relation to that photo and in a manner by which those comments are all viewable yet distinguished from one another on the basis of the CPW from which they came. Upon the displaying of this information at the step 1114, the process then ends at an end step 1116.

Figure 12:
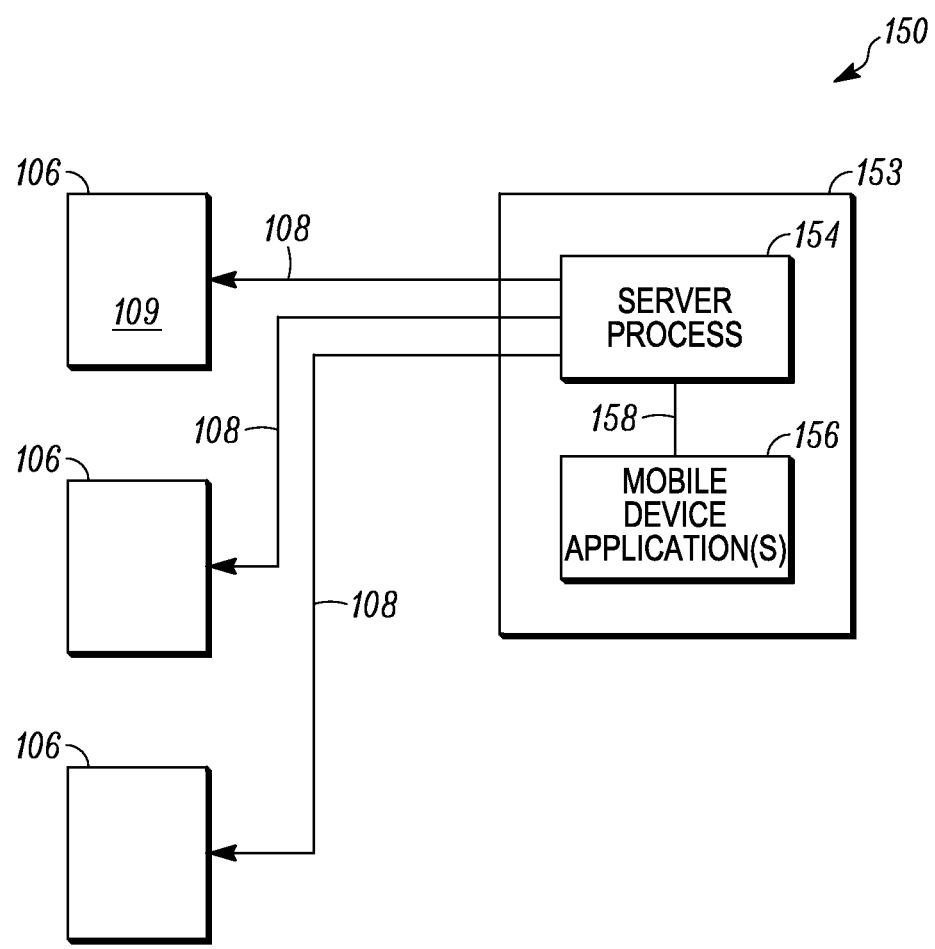
FIG. 12 is an additional diagram showing in schematic form an example of an alternate embodiment of a communications system, which differs from that of FIG. 1 in that, rather than employing an intermediary server, an electronic device of the communications system has a server process operating thereon.

Notwithstanding the discussion above regarding some embodiments of the present invention, the present invention is additionally intended to encompass numerous other embodiments and variations of the above embodiments. For example, in some other embodiments, server functionality need not be performed by an intermediary server of the communications system that is independent of the mobile devices 102, but rather than can be performed by the mobile devices themselves. Further in this regard, as shown in FIG. 12, in one such example communications system 150, a given mobile device 153 can directly communicate with the CPWs 106 by way of the communication links 108, where such communication is conducted particularly by way of a server process 154 of the mobile device. The server process 154 can be understood to be an application (or applications) that is distinct from the other mobile device application(s) 156 operating on the mobile device and, albeit the server process 154 and one or more of the other mobile device application(s) 156 can be understood as being in communication with one another as represented by a communication link 158.

In the embodiment of FIG. 12, both the server process 154 and the other mobile device application(s) 156 can be run on the processor 204 and stored in separate regions of the memory 206 (albeit, in still other embodiments, multiple processors/processing devices and/or multiple memory portions can be employed for the server process and other mobile device application(s), respectively). Nevertheless, the server process 154 can be understood as operating in a manner that is distinct from the other mobile device application(s) 156, in the same or substantially the same manner as the operation of the intermediary web server 104 of FIG. 1 is distinct from the operation of the mobile devices 102. Further, the server process 154 performs the same or substantially the same functions as the server 104 as discussed with reference to FIGS. 4-11. Among other things, therefore, the server process 154 facilitates the uploading/addition, deletion, editing, and aggregation of content. Thus, as with the web server 104, the server process 154 serves as an intermediary that allows a mobile device (in this case, particularly the other mobile device application(s) 156 of the mobile device 153) to interact with multiple CPWs 106 in a generic or shared manner even though those individual CPWs 106 can have different requirements or manners of operation, or have accumulated different information pertaining to a shared topic. Given this manner of operation, the server process 154, even though implemented on the mobile device 153, can be considered a server in its own right.

Additionally for example, while some embodiments of the present invention provide or employ all of the above-described functionality related to the uploading/addition, deletion, editing, and aggregation of content, other embodiments will employ only portions of the above-described functionality. In this regard, further for example, some embodiments employ the above-described functionality involving the uploading/addition, deletion, and editing of content, but not the aggregation of content, while other embodiments employ the above-described functionality involving the aggregation of content but not the uploading/addition, deletion, and editing of content. Additionally, for example, even though the above discussion largely concerns the mobile devices 102, it should further be understood that the present invention is not intended to be limited to mobile devices or limited to implementation in mobile devices, but rather can encompass and be implemented in a variety of other electronic devices such as desktop computers, televisions, and numerous other devices.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A method of facilitating interaction between an electronic device, as a user device, and a plurality of content provider websites, the method comprising:
   receiving from the electronic device, at a server communicatively coupled between the electronic device and each of the plurality of content provider websites, a plurality of information portions from two or more of the plurality of content provider websites that are external to the server, wherein
      each of the plurality of information portions is associated with a primary information that is available at each of the content provider websites, and wherein
      the primary information is a single file that includes at least one of a photo and a video;
   aggregating, at the server, the respective information portions so that the plurality of information portions are combined into an overall grouping including the primary information, as the single file, and the plurality of information portions from the two or more of the plurality of content provider websites, wherein
      the respective information portions describe the primary information and are maintained as distinct subportions indicating a respective content provider website within the overall grouping; and
   sending from the server a primary message for receipt by the electronic device, the primary message including the overall grouping of the information portions, wherein
      the overall grouping is sent together with at least one of the primary information
   and an indication of the primary information to which the overall grouping relates, the electronic device, upon the primary message is configured to display an image showing both at least a portion of the primary information in conjunction with the overall grouping including the distinct subportions.

2. The method of claim 1, wherein the server is an independent intermediary device distinct from yet operating in communication with each of the electronic device and the one or more content provider websites, wherein the one or more content provider websites are indirectly in communication with the electronic device by way of the server.

3. The method of claim 1, wherein
   the server is formed on the electronic device by an execution of one or more server applications upon the electronic device, and wherein
   the primary message is communicated within the electronic device from the one or more server applications to one or more additional applications.

4. The method of claim 2, wherein
   each of the information portions is a respective comment that was received at the respective content provider website from at least one third party, and wherein
   each respective comment pertains to the primary information.

5. The method of claim 4, wherein
   the overall grouping is a list of the comments that are received at the server, and wherein
   the respective comments from the respective content provider websites are maintained respectively as the distinct subportions.

6. The method of claim 4, wherein the plurality of information portions include one or more identifiers by which the server is able to determine that all of the information portions relate to the primary information.

7. The method of claim 6, wherein the server avoids including, within the overall grouping, a comment provided as part of an additional information portion received from another content provider website, based upon a determination that an additional identifier provided with the additional information portion fails to indicate a relationship between the additional information portion and the primary information.

8. The method of claim 6, wherein the server determines that all of the information portions relate to the primary information by comparing the one or more identifiers with identification information previously stored at the server.

9. The method of claim 7 further comprising, prior to the receiving of the plurality of information portions:
   receiving a first message at the server provided from the at least one part of the electronic device regarding either uploading of the primary information to the content provider websites or modifying of the primary information at the content provider websites, and
   sending a plurality of second messages, respectively, from the server for receipt by the content provider websites, respectively, wherein each respective one of the second messages includes one or more of the primary information and a respective additional portion of information concerning a respective modification to be made with respect to the primary information.

10. The method of claim 9 further comprising, prior to the receiving of the plurality of information portions:
   receiving at the server a plurality of third messages, respectively, provided from the content provider websites, respectively, the third messages being respectively indicative of whether the uploading or modifying has been performed at the respective content provider websites; and
   sending at least one fourth message from the server for receipt by the at least one part of the electronic device, the at least one fourth message being indicative of whether the uploading or modifying has been performed at one or more of the content provider websites.

11. The method of claim 10, wherein the first message includes a command to perform the uploading of the first portion of information to the plurality of content provider websites.

12. The method of claim 11, further comprising generating at the server first identification information, wherein each of the second messages includes at least one respective portion of the first identification information.

13. The method of claim 10, wherein the first message includes a command to perform the modifying of the primary information that is already available at the content provider websites.

14. The method of claim 13, wherein
the modifying involves deleting the primary information in its entirety from the plurality of content provider websites, and wherein
the plurality of content provider websites from which the primary information is deleted is a subset of an additional plurality of content provider websites at each of which the primary information is available.

15. The method of claim 13, wherein
the second messages include the respective additional portions of information, wherein
a first of the respective additional portions of information sent to a first of the content provider websites is different from a second of the respective additional portions of information sent to a second of the content provider websites, and wherein
the first respective additional portion of information includes first metadata and the second respective additional portion of information includes second metadata.

16. The method of claim 1, wherein the primary information includes the photo.

17. The method of claim 1, wherein text information communicated from or to one or more of the content provider websites includes a text-based tag.

18. The method of claim 1, wherein the server is a web server, the electronic device is a mobile device, and at least some of the content provider websites are social networking websites.

19. A system for facilitating interaction between an electronic device, as a user device, and a plurality of content provider websites, the system comprising:
a first server having a processing device and at least one memory device, wherein
the server is communicatively coupled between the electronic device and each of the plurality of content provider websites and operates as an intermediary between the electronic device and the plurality of content provider websites that are external to the first server, wherein
the first server is configured to operate so that, upon receiving a plurality of information portions from the plurality of content provider websites, and upon determining that the plurality of information portions all relate to primary information that is available at each of the content provider websites and the primary information is a single file that includes at least one of a photo and a video, the first server aggregates the information portions so as to be combined into an overall grouping including the primary information, as the single file, and the plurality of information portions from the two or more of the plurality of content provider websites in which the information portions are maintained as distinct subportions indicating a respective content provider website.

20. The system of claim 19, wherein
the at least one memory device stores not only the plurality of information portions received from the content provider websites, but also stores identification information, wherein
the identification information includes one or both of at least one identifier generated by the processing device that corresponds to the primary information, or at least one additional identifier received from the content provider websites indicative of the receipt of the primary information by the content provider websites.

21. The system of claim 19, wherein the first server avoids including in the overall grouping at least one additional comment received from one or more of the content provider websites that is determined by the first server as not relating to the primary information.

22. The system of claim 19, further comprising the electronic device, which is a mobile device, and wherein
the server is formed as either (i) an independent device distinct from but in communication with the mobile device, or (ii) a server process being executed upon the processing device of the mobile device, wherein
the server process operates in a manner that is distinct from but in communication with at least one other mobile device application being executed upon either the processing device or another processing device of the mobile device, and wherein
the at least one other part of the electronic device includes the at least one other mobile device application being executed.

23. A method of facilitating interaction between an electronic device, as a user device, and a plurality of content provider websites, the method comprising:
receiving at a server, communicatively coupled between the electronic device and each of the plurality of content provider websites and external to the plurality of content provider websites, a plurality of information portions from the plurality of content provider websites wherein each of the plurality of information portions is associated with a copy of primary information that is available at each of the content provider websites, and wherein the primary information is a single file that includes at least one of a photo and a video;
aggregating at the server the information portions so that the plurality of information portions are combined into an overall grouping including the primary information, as the sin file, and the plurality of information portions from the two or more of the plurality of content provider websites, wherein the information portions are maintained-as distinct subportions indicating a respective content provider website within the overall grouping; and
sending from the server a primary message for receipt by at least one part of the electronic device, the primary message including the overall grouping of the information portions, wherein
the overall grouping is sent together with at least one of an additional copy of the primary information and an indication of the primary information to which the overall grouping relates, whereby
the electronic device, upon the primary message being received by the at least one part thereof, is able to display an image showing both at least a portion of the primary information in conjunction with the overall grouping including the distinct subportions, wherein each of the information portions is a comment that was received at the content provider website from at least one third party, and wherein each comment pertains to the primary information, and wherein the plurality of information portions include one or more identifiers by which the server can determine that all of the information portions relate to the primary information.

24. The method of claim 23, further comprising, prior to the receiving of the plurality of information portions:

receiving a first message at the server provided from the at least one part of the electronic device, wherein the first message includes a command to perform the uploading of the first portion of information to the plurality of content provider websites.

* * * * *